US008223141B2

(12) United States Patent
Ng

(10) Patent No.: US 8,223,141 B2
(45) Date of Patent: Jul. 17, 2012

(54) SYSTEM AND METHOD FOR DRIVING DISPLAYS WITH SINGLE LATCH PIXELS

(75) Inventor: Sunny Yat-san Ng, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 848 days.

(21) Appl. No.: 12/288,012

(22) Filed: Oct. 15, 2008

(65) Prior Publication Data

US 2010/0091004 A1 Apr. 15, 2010

(51) Int. Cl.
*G06F 3/038* (2006.01)

(52) U.S. Cl. ....................................... 345/212; 345/214

(58) Field of Classification Search .................. 345/212, 345/214

See application file for complete search history.

(56) References Cited

U.S. PATENT DOCUMENTS 5,668,611 A * 9/1997 Ernstoff et al. ............... 348/771

* cited by examiner

*Primary Examiner* — Alexander Eisen
*Assistant Examiner* — Robin Mishler
(74) *Attorney, Agent, or Firm* — Larry E. Henneman, Jr.; Henneman & Associates PLC

(57) ABSTRACT

A method is disclosed for loading and modulating the pixels of a display in parallel. The method includes the steps of receiving a plurality of data bits, loading the data bits into the storage elements of single-latch pixels in a plurality of rows of the display within a loading period, turning on a light source prior to the end of the loading period when each of the loaded bits has an assertion time greater than or equal to the duration of the loading period. Alternatively, the method includes turning on the light source following the loading period when each of the bits has an assertion time less than the duration of the loading period. Another method includes modulating the light source on and off to conserve power when the light source is supposed to be turned on. A display driver is also disclosed to perform the inventive methods.

57 Claims, 13 Drawing Sheets

SYSTEM AND METHOD FOR DRIVING DISPLAYS WITH SINGLE LATCH PIXELS

BACKGROUND

1. Field of the Invention

This invention relates generally to display drivers and methods for driving a display, and more particularly to a system and method for driving a display where the pixels of the display can be loaded with data and modulated simultaneously. Even more particularly, this invention relates to a system and method for conserving power in a display system.

2. Description of the Background Art

FIG. 1 shows a data loading and modulation diagram 100 showing a prior art method for driving a display with a pixel array. As shown in FIG. 1, data bits are loaded into the pixels of each row of the display while the light source is turned off. Once data has been loaded into the pixels of each row of the display, then the light source is turned on, and the pixels are modulated for an amount of time depending on the significance of the bits that were loaded. FIG. 1 is based on a four-bit, binary-weighted pulse width modulation (PWM) driving scheme.

The pixels of the display are loaded with data and modulated as follows. Between times $t_0$ and $t_1$, a least significant bit (B0) is loaded into the pixels of each row of the display. Note that loading all the B0 bits takes a finite amount of time, which is defined between times $t_0$ and $t_1$. Between times $t_0$ and $t_1$, the light source that illuminates the display is turned off, as indicated by the "Light Source" indicator 102 near the top of the diagram. Once all B0 bits are loaded, then the light source is turned on and the pixels are modulated between times $t_1$ and $t_2$ such that the values of the particular B0 bits are displayed on their respective pixels for a time dependent on the significance of the B0 bits. Then, during times $t_2$ and $t_3$, the light source is turned off, and a next least significant bit (B1) is loaded into the pixels of each row of the display. Once all B1 bits are loaded, then the light source is turned on, and the pixels are modulated between times $t_3$ and $t_4$ for a time dependent on the significance of the B1 bits. Subsequently, a second next least significant bit (B2) is loaded into the pixels of each row of the display between times $t_4$ and $t_5$. Again, the B2 bits are loaded with the light source turned off. Then, once all B2 bits are loaded, the light source is turned on and the pixels are modulated between times $t_5$ and $t_6$ for a time dependent on the significance of the B2 bits. The most significant bits (B3) are then loaded into the pixels of the display between times $t_6$ and $t_7$ with the light source turned off, and once loading is complete, the pixels are modulated between times $t_7$ and $t_8$ for a time that depends on the significance of the B3 bits. Finally, between times $t_8$ and $t_9$, B0 data is loaded for the next frame with the light source turned off, and the load and modulation process repeats itself.

The prior art driving scheme suffers several drawbacks. Most notably, the display is not illuminated during a significant portion of the frame time because the loading and modulation processes are completely separated, and the light source is off during the loading process. Because the modulation time of the display is equal to the difference between the frame time and the total load time for all bits, the images produced by the pixels appear darker when large portions of the frame time are required for loading data. In other words, the light throughput of the display is reduced as the modulation time decreases and the loading time increases. Another disadvantage of the prior art is that many displays require complicated pixel element designs that facilitate the separation of the loading and modulating processes. As a result, the manufacturing costs and design complexity of the display increases. In addition, because many of the prior art pixels require additional components to operate, there is a larger pitch between adjacent pixels in the display.

What is needed, therefore, is a system and method for driving a display that increases light throughput of the display over a frame during which image data is asserted on the display. What is also needed is a system and method that minimizes the circuit complexity of the pixel elements in the pixel array of the display. What is also needed is a system and method that conserves power consumption of the display system.

SUMMARY

The present invention overcomes the problems associated with the prior art by providing a system and method that facilitates simultaneously loading and modulating pixel cells in a display. In addition, the invention facilitates modulating a light source and simple pixel designs. As a result, the invention improves light throughput of a display and reduces power consumption.

A method for driving a display having an array of pixels according to the present invention includes receiving a data bit having a first bit significance, loading the data bit into the storage element of an associated pixel, and turning a light source on to illuminate the pixel while the data bit is stored in the storage element. The pixels in the array are single-latch pixels such that they have a single storage element (e.g., a data latch) with an output electrically coupled to the pixel electrode. Once a data bit is loaded into the storage element, the value of the data bit controls the voltage on the pixel electrode until a new data bit is loaded into the storage element. Accordingly, the driving method also includes the steps of receiving a second data bit having a second significance, loading the second data bit into the storage element of the pixel, and keeping the light source turned on while the first data bit is replaced by the second data bit when the second data bit is loaded in the storage element. The data bit is loaded into the storage element (along with data bits for pixels in other rows) during a first loading period and the second data bit is loaded into the storage element (also along with data bits for pixels in other rows) during a second loading period. The time periods that the first data bit and the second data bit are each stored in the storage element exceed the duration of the first loading period and the second loading period, respectively.

The method further includes receiving a third data bit and loading the third data bit into the storage element of the pixel (along with bits loaded into the storage elements of other pixels) during a third loading period. The light source is turned off during the third loading period and then is turned back on after the third loading period for an amount of time corresponding to the third bit significance. In this case, the time period during which the light source is turned on and the third data bit is stored in the storage element is less than the duration of the third loading period. Optionally, an off-state can be asserted on the pixel electrode of the pixel prior to the step of loading the third data bit, such as by loading a bit having an off-state value into the storage element of the pixel, where the off-state is asserted for an amount of time equal to the duration of the second loading period.

The methods of the present invention further include the steps of receiving a fourth data bit; loading the fourth data bit into the storage element of the pixel during a fourth loading period, and turning the light source on while the third data bit (or off-state bit) is replaced by the fourth data bit when the fourth data bit is loaded into the storage element of the pixel.

In this case, the time period that the fourth data bit is stored in the storage element is greater than or equal to the duration of the fourth loading period. Furthermore, this particular method can include the step of asserting an off-state on the pixel electrode of the pixel prior to the step of loading the fourth data bit.

Optionally, the durations of the loading period, the second loading period, the third loading period and the fourth loading period are all equal. In additional, the light source is a digitally-driven light source, such as a light emitting diode (LED), laser, or other such light source capable of modulation. Additionally, the display can be driven in field-sequential mode or can modulate only one color of light, such as in a color separation and recombination system.

Another novel method of the present invention involves modulating the light source during portions of a frame time in order to conserve power. This method includes the steps of defining a data assertion period during which a multibit data word will be asserted on a pixel of the display, defining a light modulation sequence that includes a plurality of off time intervals (where the light source is turned off) and a plurality of on time intervals (where the light source is turned on) to generate a full brightness display image, and periodically turning the light source off during the on time intervals to generate a lower brightness image. The light modulation sequence is coordinated with the data assertion sequence.

A more particular method includes defining a second data assertion sequence to assert a second multibit data word on the pixel, defining a second light modulation sequence having the same on time intervals and the same off time intervals as the light modulation sequence, and periodically turning off the light source during the on time intervals in the second modulation sequence. However, different ones of the on time intervals are turned off during the second modulation sequence than the on time intervals turned off in the light modulation sequence.

Generally, the step of periodically turning the light source off during the on time intervals includes turning the light source on every $x^{th}$ one of the on time intervals and turning the light source off during all other ones of the on time intervals, where x is an integer greater than one. For example, where x equals two, the light source is turned off for every other one of the time intervals. To balance the light on the display over two frames, the light source can be turned off every other time interval starting with a first one of the on time intervals during one frame of data and then turned off every other time intervals starting with a second one of the time intervals, which is different from the first one of the on time intervals, during a second frame. As another example, where x equals four, the light source can be turned on during every fourth one of the on time intervals and then turned off during all the other on time intervals in the modulation sequence. Again, the light source can be turned off starting with a different on time interval over each of four frames of data to equalize the amount of light each pixel receives over those four frames.

Like above, each bit of the multibit data word is loaded during a loading period that occurs during a predetermined number of time intervals in the light modulation sequence. Therefore, according to a particular method, the value of x is less than the number of time intervals in the loading period.

A display driver for carrying out the methods of the present invention is also described. A display driver of the present invention includes a data input terminal set operative to receive a first data bit and a second data bit intended to be displayed on a pixel of the display, a data controller operative to load the data bit and the second data bit into the storage element of the associated pixel, and a light source controller operative to turn a light source on and off. The light source controller is operative to turn the light source on while the data bit is stored in the storage element of the pixel and while the second data bit is loaded into and stored in element, thereby replacing the first data bit. In another embodiment, the data controller can also define a data assertion sequence for asserting a multibit data word that includes the first and second bits and the light source controller can define a light modulation sequence having a plurality of off time intervals and on time intervals to generate a full brightness display image. In addition, the light source controller can periodically turn the light source off during the on time intervals to generate a lower brightness display image.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a system and method that facilitates simultaneously loading and modulating pixel cells in a display. In addition, the present invention conserves power and permits using simple pixel designs in the pixel array. In the following description, numerous specific details are set forth (e.g., dual frame buffers, data mapping, etc.) in order to provide a thorough understanding of the invention. Those skilled in the art will recognize, however, that the invention may be practiced apart from these specific details. In other instances, details of well known display driving practices (e.g., routine optimization, memory and display addressing, etc.) and components have been omitted, so as not to unnecessarily obscure the present invention.

Figure 1:
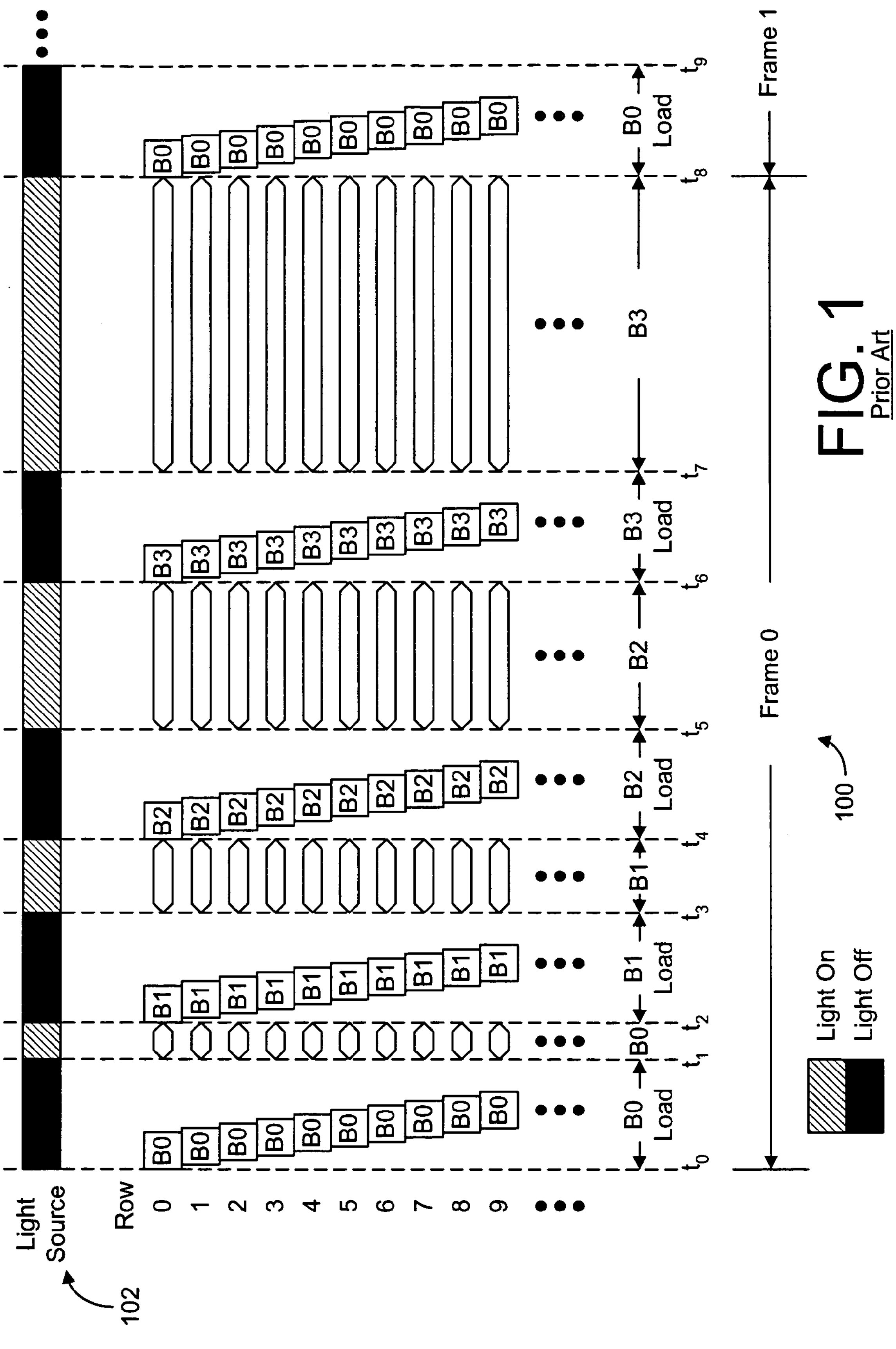
FIG. 1 Prior Art
FIG. 1 is a diagram showing a prior art data loading and modulation scheme.
Figure 2:
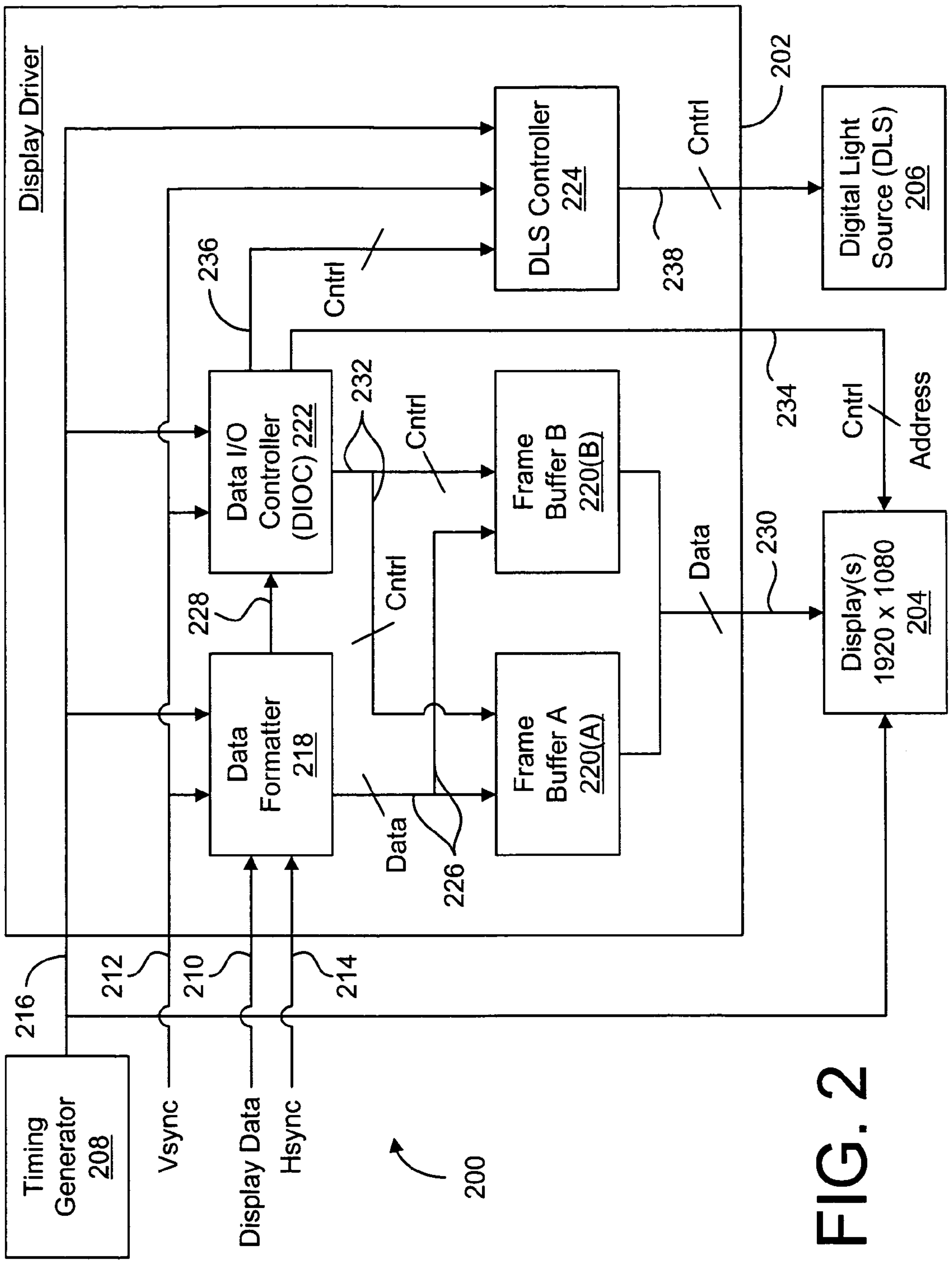
FIG. 2 is a block diagram showing a display driver according to the present invention.

FIG. 2 shows a display system 200 according to one embodiment of the present invention. Display system 200 includes a display driver 202, one or more displays 204, a digital light source (DLS) 206, and a timing generator 208. In addition, display driver 202 includes a data input terminal set 210, a vertical synchronization (Vsync) input 212, a horizontal synchronization (Hsync) input 214, and a timing input 216. According to the present embodiment, display driver 202 receives multibit display data via input terminal set 210, timing signals (e.g., clock signals, etc.) via timing input 216, and Vsync and Hsync signals via Vsync input 212 and Hsync input 214, respectively. Display driver 202 then uses the display data and various input signals to drive the display 204 to produce a series of pixelated images on display 204. DLS 206 illuminates display 204 and the images produced thereby.

In the present embodiment, display system 200 includes only one display 204, which includes an array of pixels (not shown) that are arranged in 1920 columns and 1080 rows. As will be described below with respect to FIG. 4, each pixel in display 204 is a single-cell pixel. In other words, each pixel in display 204 includes only one storage element (e.g., a data latch), whose output is coupled to the pixel electrode of the particular pixel. Accordingly, data that is latched into the pixel's data latch controls the voltage value asserted on the pixel electrode depending on the data bit stored in the data latch. It should also be noted that in the present embodiment, display 204 is a reflective display device, but the present invention can be employed with transmissive displays as well.

In addition, display driver 202 drives display 204 according to a field-sequential modulation scheme. In a field sequential modulation scheme, display 204 modulates each of the three primary colors of light consecutively within a frame time. For example, display 204 might first modulate red light with red image data for one frame, then modulate green light with green image data for the same frame, and then modulate blue light with blue image data for the same frame. It should be noted that although the present invention will be described with respect to a field-sequential driving scheme, it is equally applicable to other types of display systems, such as three panel display, color separation and recombination systems.

DLS 206 is a digitally-driven light source that can be turned on and off very quickly based on inputs from display driver 202. In addition, DLS 206 includes means for producing red, green, and blue light. In the present embodiment, DLS 206 contains light-emitting diodes (LEDs) that selectively produce red, green, and blue light that can be separately controlled by a pulse-width modulated signal received from display driver 202. However, other digital light sources may be employed with the present invention, such as colored lasers.

Display driver 202 contains several elements, which are also shown in FIG. 2. In particular, display driver 202 includes a data formatter 218, two frame buffers 220(A) and 220(B), a data input/output controller (DIOC) 222, and a digital light source (DLS) controller 224. These components operate to load data into and modulate the pixels of display 204. Display driver 202 also controls the modulation of DLS 206.

Data formatter 218 receives input display data via input terminal set 210, a timing signal via timing input 216, and Vsync and Hsync signals via Vsync input 212 and Hsync input 214, respectively. Data input controller 218 utilizes the timing, Vsync, and Hsync signals to coordinate its operation. In particular, data formatter 218 receives input display data, formats the input data, and outputs the formatted data onto a plurality of buffer input lines 226 such that the data can be loaded into one of frame buffers 220(A) and 220(B). For example, data formatter 218 formats a first frame of display data, assert the formatted data onto buffer input lines 226, and the formatted display data is loaded into frame buffer 220(A). In a subsequent frame, data formatter 218 would assert formatted display data on buffer input lines 226 that would be loaded into frame buffer 220(B). Optionally, data formatter 218 can assert signals on DIOC 222 via signal line 228 to indicate to DIOC 222 that data formatter 218 is ready to or has completed formatting and asserting a frame of display data onto buffer input lines 226.

Frame buffers 220(A) and 220(B) alternatively receive and output frames of display data responsive to the control signals that they receive from DIOC 222. For example, while frame buffer 220(A) is being loaded with a new frame of formatted display data from data formatter 218 via buffer input lines 226, frame buffer 220(B) can be outputting formatted display data to display 204 via a plurality of display data lines 230. In a subsequent frame, frame buffer 220(A) would output its previously-loaded display data to display 204 while frame buffer 220(B) would be loaded with the next frame of formatted display data from data formatter 218. Therefore, frame buffers 220(A) and 220(B) advantageously permit display driver 202 to simultaneously output display data for a current frame while receiving and storing display data for a subsequent frame. In the present embodiment, frame buffers 220 (A) and 220(B) have sufficient capacity to store a predetermined number of data bits of formatted display data for each pixel in display 204 for each color that display 204 modulates. For example, if ten bits of formatted display data are needed to modulate a pixel for each color, then frame buffers 220(A) and 220(B) would each contain at least 30 bits (i.e., 10 bits per color×3 colors) of memory for each pixel in display 204.

DIOC 222 controls the input and output of formatted display data into and out of frame buffers 220(A) and 220(B). In particular, DIOC 222 asserts control signals via buffer control lines 232 on frame buffers 220(A) and 220(B). If DIOC 222 asserts output control signals (e.g., memory addresses, select signals, etc.) on one of frame buffers 220(A) or 220(B) via control lines 232, then that frame buffer outputs formatted display data onto the display data lines 230 connected to display 204. Additionally, the other of the frame buffers 220 (A) and 220(B) would receive and store formatted display data (e.g., via a buffer input terminal set) from data formatter 218 responsive to the same or similar control signals asserted on buffer control lines 232 by DIOC 222. For example, DIOC 222 could instruct frame buffer 220(A) to output display data to display 204 by asserting a select signal and a series of memory addresses on buffer control lines 232. In addition, the control signals asserted on lines 232 would also instruct frame buffer 220(B) to begin loading formatted data from data formatter 218 via buffer input lines 226. Note that the control signals asserted by DIOC 222 that control the input and output of data from frame buffers 220(A) and 220(B) can be the same signals or different signals. For example, a select signal could indicate to both of frame buffers 220(A) and 220(B) which buffer is to receive data and which buffer is to output data. In addition, the same memory addresses could tell both frame buffers 220(A) and 220(B) where to read data from or write data to. Note that DIOC 222 utilizes the same timing signals received via timing input 216 and the Vsync signals received via Vsync input 212 to coordinate its operation.

DIOC 222 also asserts control signals on display 204 via display control lines 234 to coordinate the loading of formatted display data output on display data lines 230 from frame buffers 220(A) and 220(B) into the pixels in the rows of display 204. For example, as rows of data are output from one of frame buffers 220(A) and 220(B) onto display data bus 230, DIOC 222 asserts row addresses on display control lines 234 causing the appropriate row of display 204 to be enabled such that the data asserted on display data bus 230 are loaded into the pixels of the enabled row. Note that the addresses asserted on display control lines 234 can optionally be the same addresses asserted on the frame buffer(s) 220(A) and 220(B). In such a case, one of frame buffers 220(A) or (B) could output data on the rising edge of a timing signal after DIOC 222 asserts a memory address, and display 204 could latch the output display data into the rows of display 204 on the falling edge of the timing signal to facilitate data stabilization. In the present embodiment, data is stored in frame buffers 220(A) and 220(B) according to bit plane such that bit planes of display data are output on display data lines 230. Therefore, data bits having the same time-weighted significance are output on display data lines 230 at the same time.

DIOC 222 also asserts data state signals on DLS controller 224 via state line 236 to indicate to DLS controller 224 when DLS 206 should be turned on and turned off. For example, DIOC 222 can indicate to DLS controller 224 via state line 236 that DLS 206 should be turned on when DIOC 222 loads a bit plane containing bits have a time-weighted significance greater than or equal to the time required to load the bit plane into the row(s) of display 204. Alternatively, DIOC 222 can indicate to DLS controller 224 via state line 236 that DLS 206 should be turned off when the bits in a bit plane being loaded into one or more row(s) of display 204 have a time-weighted significance that is less than the time required to load the bit plane into the rows of the display. The signals asserted by DIOC 222 on state line 236 will be discussed below.

DLS controller 224 controls the operation of DLS 206 depending on the time values received via timing input 216 from timing generator 208 and the state signals received on state line 236 from DIOC 222. In particular, DLS controller 224 modulates DLS 206 between an on-state and an off-state with a pulse-width modulated signal via DLS control lines 238. Accordingly, DLS controller 224 can drive DLS 206 to full on, full off, or some intermediate time-averaged illumination value based on a light modulation sequence. As will be explained below, driving DLS 206 according to the inventive light modulation sequences advantageously conserves power.

Figure 3:
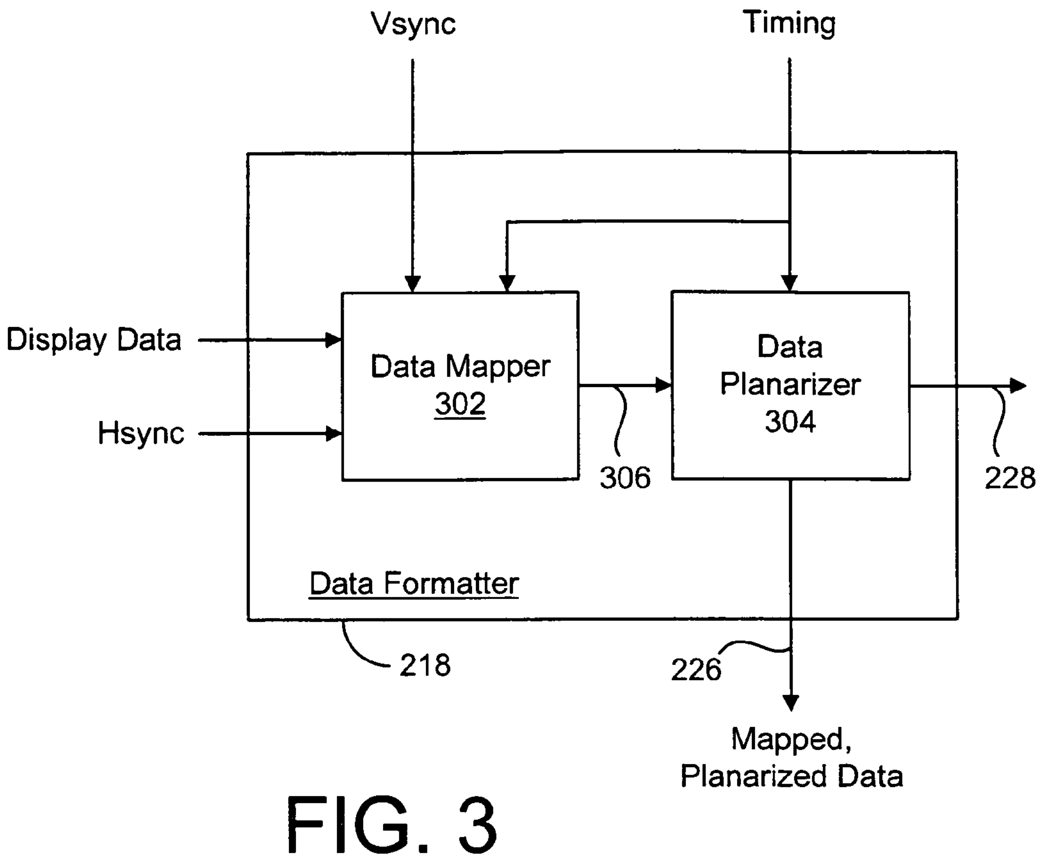
FIG. 3 is a block diagram showing the data formatter of FIG. 2 in greater detail.

FIG. 3 is a block diagram showing data formatter 218 in greater detail. In particular, data formatter 218 includes a data mapper 302 and a data planarizer 304. Data mapper 302 receives display data via data input terminal set 210, maps the received display data, and outputs the mapped display data to data planarizer 304 via mapped data lines 306. In a particular embodiment, data mapper 302 receives an n-bit binary-weighted data word for each color red, green, and blue. Data mapper 302 uses a lookup table to map each n-bit binary-weighted data word into an m-bit compound data word. Often, the compound data word will include a larger number of bits than the binary-weighted data word. For example, data mapper 302 could map a 4-bit binary weighted data word into a 5-bit compound data word or could map an 8-bit binary-weighted data word into a 10-bit compound-data word.

Data mapper 302 improves the accuracy of the displayed intensity values because the incoming video data is converted to higher resolution data. An intensity value of the binary-weighted data word is mapped to a higher-resolution intensity value that provides the closest correlation between the actual intensity displayed on a pixel in display 204 and the value of the original video data. In other words, mapping the binary-weighted data to higher resolution compound data facilitates closer matching between the intensity values of the original display data and the actual intensities produced by display 204.

In the present embodiment, data mapper 302 is a look-up table that converts input display data into compound display data. The compound display data includes a plurality of arbitrarily-weighted bits and a plurality of binary-weighted bits. The number and time-weighted significance of each of the arbitrarily-weighted bits and of the binary bits will be determined according to the particular driving scheme. In addition, DIOC 222 will be programmed to know the bit significance of each bit in the compound data word that are created by data mapper 302.

For each frame of display data, data planarizer 304 receives the m-bit, compound mapped display data via mapped data lines 306, planarizes the mapped display data according to bit plane (i.e., according to significance), and outputs the planarized data on buffer input lines 226. Data planarizer 304 can output the planarized bit planes of compound data in any order. However, in a particular embodiment, data planarizer 304 first outputs bit planes that contain bits having a bit significance that is greater than or equal to the duration of a predetermined loading period of display 204 and then outputs bit planes that each have a bit significance that is less than the duration of the predetermined loading period. Also note that in another particular embodiment, data planarizer 304 can also indicate to DIOC 222 when an entire frame of data has been planarized or is waiting to be planarized, such as by asserting a signal on signal line 228.

Figure 4:
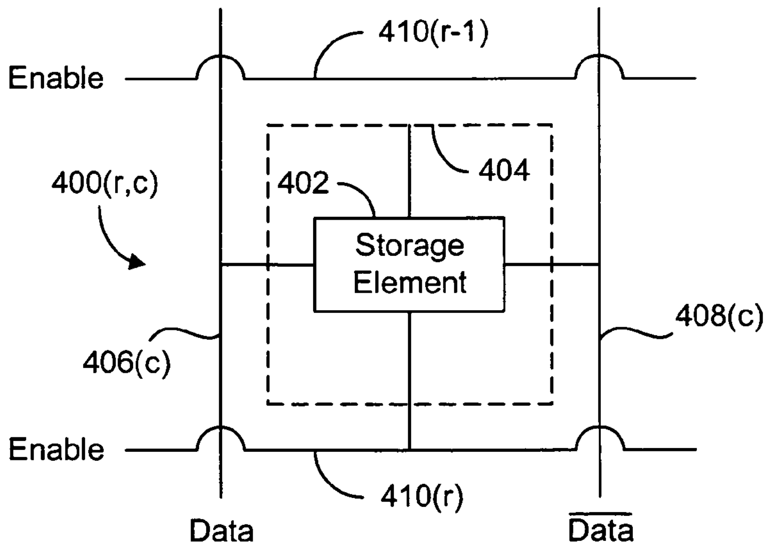
FIG. 4 is a block diagram showing a single-latch pixel according to the present invention.

FIG. 4 shows an example of a single-latch pixel cell 400(*r, c*) of display 204 according to one embodiment of the present invention, where (r) and (c) indicate the row and column, respectively, of pixel cell 400(*r, c*) in the pixel array of display 204. Pixel cell 400(*r, c*) includes a storage element 402, a pixel electrode 404 (e.g., a mirror electrode overlying the circuitry layer of display 204), a common electrode (not shown) overlying the pixel electrode, and liquid crystal material (not shown) between pixel electrode 404 and the common electrode. Storage element 402 is a static random access memory (SRAM) latch. One input of storage element 402 is coupled to a first data line 406(*c*), and the other input of storage element 402 is coupled to an inverted data line 408(*c*). Storage element 402 latches data asserted on one of data lines 406(*c*) and 408(*c*) into storage element 402 when an enable signal is asserted on a word line 410(*r*). The output of storage element 402 is electrically coupled to pixel electrode 404. Accordingly, when a data bit is latched into storage element 402, the value of that data bit is almost immediately asserted on pixel electrode 404. Accordingly, whenever a data bit is stored in storage element 402, the value of that data bit controls the voltage asserted on pixel electrode 404.

As indicated above, DIOC 222 coordinates data delivery to pixel 400(*r, c*) and enables pixel 400(*r, c*) at the correct times. In particular, DIOC 222 instructs one of frame buffers 220(A) and 220(B) to output a particular bit plane of data that is ultimately asserted on one of data lines 406(*c*) and 408(*c*) and enables word line 410(*r*) by asserting a row address on display control lines 234. When a row address is asserted on display control bus 234, display 204 decodes the row address (e.g., via an internal row decoder) and asserts an enable signal on the corresponding word line 410(*r*). At that time, the data being asserted on one of data line 406(*c*) or inverted data line 408(*c*) will be latched into storage element 402. Also note that having two data lines 406(*c*) and 408(*c*) increases data delivery rates to pixel 400(*r, c*). In addition, data lines 406(*c*) and 408(*c*) facilitate debiasing of pixels 400(*r, c*) during display operation.

The single-latch pixel structure of the pixels 400 in display 204 provides several advantages. First, because pixels 400 contain fewer circuit elements than prior art pixel cells, they take up less real estate in the pixel array. Accordingly, the pitch between adjacent pixels 400 in the pixel array can be reduced thereby decreasing the size of display 204 and increasing its resolution per unit area. For example, the inventors have found that single-latch pixels can be manufactured at a pitch of approximately 4.5 micrometers as opposed to 8 micrometers for a dual-latch pixel in a 0.18 micrometer complementary metal-oxide semiconductor (CMOS) technology. Second, because pixels 400 contain fewer elements than prior art pixels, display 204 is easier to manufacture than prior art displays having, for example, dual-latch pixels. Third, because pixels 400 contain fewer elements, they require less area.

Figure 5:
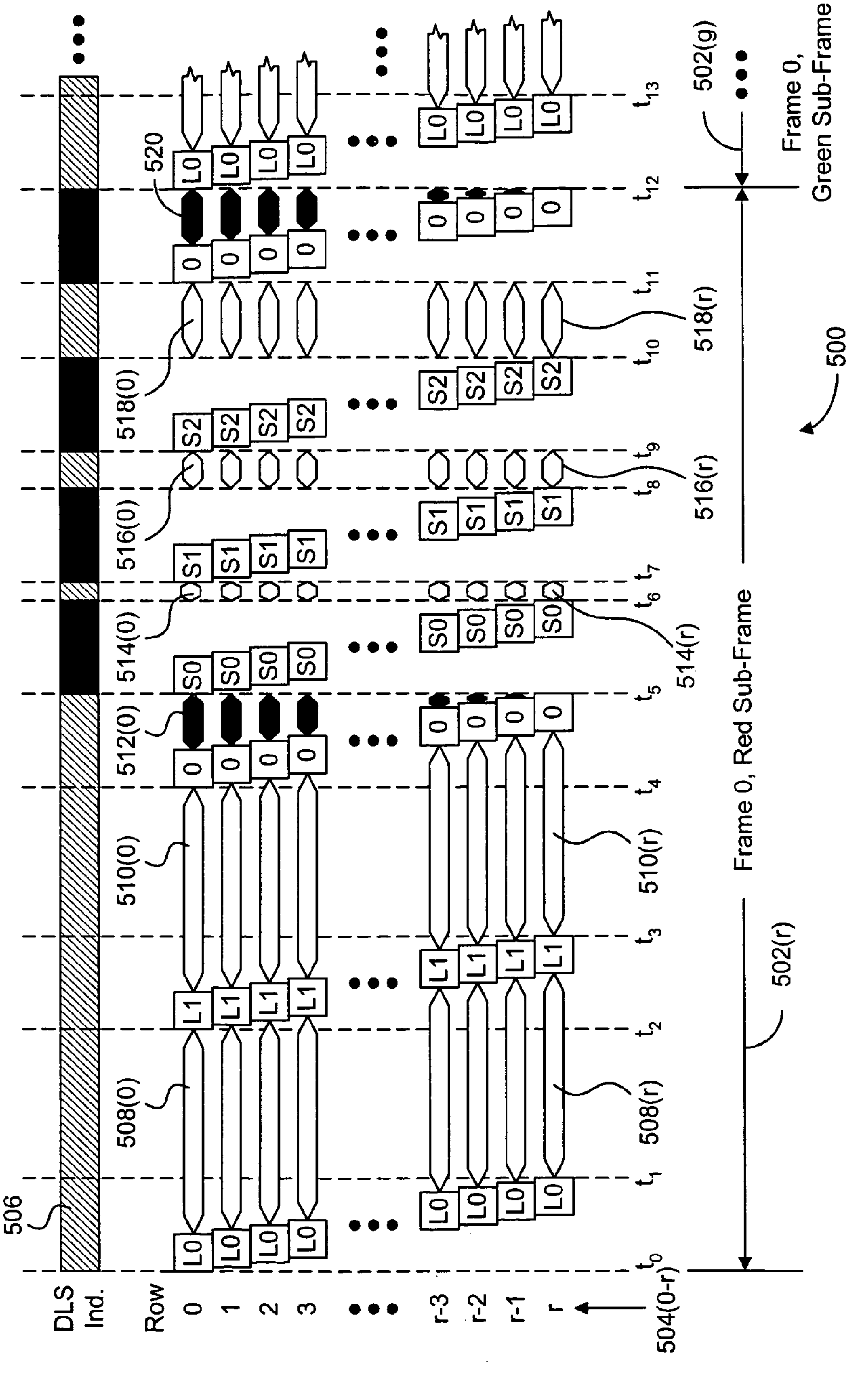
FIG. 5 is a diagram showing a scheme for loading and modulating a display according to the present invention.

FIG. 5 is a diagram showing a scheme 500 for loading and modulating the pixels 400 of display 204 and for turning digital light source 206 on and off according to the present invention. According to scheme 500, the pixels 400 in display 204 can be simultaneously loaded with display data and modulated during portions of the frame time without losing any intensity resolution in the data used to drive the pixels 400. Scheme 500 describes a single display 204 operating in field sequential mode. As shown, the total frame time is divided into three sub-frames 502(*r, g, b*), one for each color of modulated light. Accordingly, a full sub-frame 502(*r*) is shown in FIG. 5 for the color red and is followed by the green sub-frame 502(*g*), only a portion of which is shown. The blue sub-frame 502(*b*) is omitted from FIG. 5, but would follow the green sub-frame 502(*g*). As noted above, however, the present invention is equally applicable to three-panel display systems.

Scheme 500 shows various times within sub-frame 502(*r*) during which data is loaded into the pixels 400 of display 204 and the pixels 400 are modulated. In particular, scheme 500 shows loading and modulation times for the pixels 400 in each of a plurality of rows 504(0-*r*) in display 204. Note that rows 504(0-*r*) can represent all or only some of the rows 504(0-*r*) in display 204.

Scheme 500 also includes a DLS indicator 506 that indicates the status of DLS 206. In particular, a hatched DLS indicator 506 indicates that DLS 206 is turned on and illuminating display 204, and a solid black DLS indicator 506 indicates that DLS 206 is turned off and is not illuminating display 204. In other words, DLS indicator 506 shows a light modulation sequence over the entire frame, including sub-frames 502(*r, g,* and *b*), that yields a full brightness display image that will be produced on display 204. The modulation of DLS 206 will be described in greater detail below.

In scheme 500, each pixel 400 in a particular row 504 is driven according to a data assertion sequence, which is programmed into DIOC 222. In the present embodiment, the data assertion sequence includes at least five data bits: L0, L1, S0, S1, and S2 within sub-frame 502(*r*). Accordingly, bits L0, L1, S0, S1, and S2 are loaded by bit plane into each pixel in a particular row 504 at various times within red sub-frame 502(*r*). Bits L0 and L1 are each termed "longer bits." A longer bit is a bit that has a time-weighted significance greater than or equal to the time needed to load the longer bit plane into the pixels 400 of each of rows 504(0-*r*). In other words, longer bits are bits that are stored in the storage element 402 of a pixel 400 while light source 206 is turned on for a time greater than or equal to the duration of the loading period during which the longer bit was loaded. In contrast, bits S0, S1, and S2 are termed "shorter bits." A shorter bit is a bit that has a time-weighted significance that is less than the time needed to load a shorter bit into the pixels 400 in each of rows 504(0-*r*). In other words, a shorter bit is one that will be stored in a storage element 402 while light source 206 is turned on for an amount of time less than the duration of the loading period during which the shorter bit was loaded. Note that a bit's classification as a "longer bit" or "a shorter bit" depends on its time-weighted bit significance and not whether the bit is a binary-weighted bit or an arbitrarily-weighted bit. Optionally, the data assertion sequence can include one or more bits having an off-state value as will be described below.

The pixels 400 of display 204 are loaded with data and modulated as follows according to the data assertion sequence described in driving scheme 500. During a first loading period between times $t_0$ and $t_1$, a first longer bit L0 is loaded into the storage element 402 of each pixel 400 in rows 504(0-*r*). Note that loading all the L0 bits takes a finite amount of time because the rows 504(0-*r*) of pixels 400 are loaded consecutively between times $t_0$ and $t_1$. Because each pixel 400 is a single-latch pixel, an electrical signal corresponding to the value of the L0 bit is asserted on a pixel 400's pixel electrode 404 as soon as the L0 bit is loaded into the storage element 402 of that pixel. In other words, the L0 bit in the storage latch 402 controls the voltage asserted on the pixel electrode of the associated pixel 400 whenever the L0 bit is stored in the storage latch 402. Accordingly, the value of an L0 bit is asserted on the pixel electrode 404 of a particular pixel 400 until a subsequent bit (e.g., bit L1) is loaded into the pixel electrode 404. A pixel 400 will therefore modulate light for as long as the L0 bit is stored into its storage element 402. A modulation bar 508 indicates the duration that the pixels 400 loaded with L0 bits are modulating light. Note that the time-weighted significance, and thus the light modulation time (i.e., the length of a light modulation bar 508), for the L0 bits in each row 504(0-*r*) is longer than the loading period between times $t_0$ and $t_1$.

At time $t_2$, the storage elements 402 of the pixels 400 in row 504(0) are loaded with a second longer bit L1 and the value of the second longer bits L1 are asserted on the pixel electrodes 404 of the associated pixels 400 in row 504(0). Like row 504(0), the pixels 400 in the remaining rows 504(1-*r*) are loaded between times $t_2$ and $t_3$ with associated L1 bits such that the value of those L1 bits are asserted on the respective pixel electrodes 404 of pixels 400. Note that the duration between times $t_2$ and $t_3$ define a second loading period for loading the L1 bits. Also, like the L0 bits, the value of each L1 bit is asserted on the pixel electrode 404 of a pixel 400 for its time-weighed bit significance until a subsequent bit is loaded into the storage element 402 of that pixel 400. Furthermore, each L1 bit has a time-weighted significance, and thus modulates light for a time (represented by a light modulation bar 510) that is greater than or equal to the duration of the second loading period between times $t_2$ and $t_3$.

In the present embodiment, the time between time $t_0$ and time $t_2$ is equal to the time needed to load one row 504(0) of L0 bits plus the time-weighted significance of the L0 bit. Similarly, the time between times $t_0$ and $t_3$ is equal to the time needed to load an L0 bit into each pixel 400 in rows 504(0-*r*), assert the L0 bits on the pixel electrodes 404 of the associated pixels 400, and then load an L1 bit into each pixel in rows 504(0-*r*) of display 504. However, note that at particular times (e.g., between t2 and t3), some rows 504 will be asserting L0 data while other rows 504 will be asserting L1. However, during times $t_1$ to $t_2$, the pixels 400 in each row 504(0-*r*) assert L0 data. In other words, the loading periods and modulation periods of the pixels 400 in different rows 504(0-*r*) of display 204 temporally overlap between times $t_0$ and $t_3$.

Next, between times $t_4$ and $t_5$, an off-state is asserted on the pixels 400 loaded with L1 bits, beginning with row 504(0) at time $t_4$. In the present embodiment, at time $t_4$, the storage elements 402 of the pixels 400 in row 504(0) are loaded with a bit having an off-state value (represented as a "0") such that off-states are asserted on the pixel electrodes 404 of pixels 400 in row 504(0). Similarly, between times $t_4$ and $t_5$, which defines a third loading period equal in duration to the second loading period between times $t_2$ and $t_3$, the pixels 400 in the remaining rows 504(1-*r*) are also loaded with bits having an off-state value such that off states are asserted on their respective pixel electrodes 404. Note that an off-state is represented in FIG. 5 by a black off-state light modulation bar 512 in rows 504.

Off-states are asserted on the rows 504(0-*r*) of pixels 400 in the same order as longer bits L1 were loaded into the storage elements 402 of pixels 400 during the second loading period between times $t_2$ and $t_3$, which ensures that the longer bits L1 each modulate light for an equal amount of time, represented by light modulation bars 510. The value of each off-state bit is asserted on a pixel 400 until a subsequent bit is loaded into the storage element 402 of pixel 400. When an off-state is asserted on a pixel electrode 404 of a particular pixel, that pixel 400 appears dark even if DLS 206 is illuminated.

Although off-state bits are loaded between times $t_4$ and $t_5$ to create an off-state according to the present embodiment, other means to generate off-states can be employed. For example, each pixel 400 could contain circuitry that, upon receiving an off-state signal, would assert the same voltage on the pixel electrode 404 (or the storage element 402) as was being asserted on the common electrode of the display 402 (assuming display 402 was a liquid crystal display).

U.S. Pat. No. 6,067,065 (the '065 patent) issued May 23, 2000 to Worley, III et al. and is assigned to a common assignee. The '065 patent discloses a display with a pixel cell structure, wherein the pixel electrode is selectively coupled to voltage supply lines by a switch depending on the value of the data bit stored in a latch of the pixel cell. Methods for driving the display are also disclosed. U.S. Pat. No. 6.067,065 is incorporated herein by reference in its entirety.

The combination of the present invention with features of the '065 patent provides unexpected advantages. The ability to "turn off" the entire display (by controlling the voltages on the voltage supply lines), even while data is loaded and/or being loaded, facilitates the use of the methods of the present invention in systems where turning the light source off is impractical or impossible. In addition, the display can be debiased without writing inverse data to the pixel cells of the display. Indeed, these are only a couple examples of the many advantages provided by the synergy between the present invention and the '065 patent.

Because off-state bits are used to assert an off-state between $t_4$ and $t_5$, some of the mapped data bits that data mapper 302 generates and outputs to data planarizer 304 will be off-state bits. As will be discussed in greater detail below, data mapper 302 generates an off-state bit for each longer-to-shorter bit transition and for every shorter-to-longer bit transition occurring within and between sub-frames 502(*r, g*, and *b*) of a frame. Accordingly, the off-state bits form a part of the data assertion sequence of the present invention.

As indicated by DLS indicator 506, DLS 206 is turned on and illuminates display 204 (and rows 504(0-*r*) of pixels 400) between times $t_0$ and $t_5$. By keeping DLS 206 turned on between times $t_0$ and $t_5$, each pixel 400 in each of rows 504(0-*r*) is illuminated while it is being loaded with display data and while it has data stored in its storage element 402. Because DLS 206 remains on between times $t_0$ and $t_5$ and the loading periods and modulation periods of pixels 400 in rows 504(0-*r*) overlap, the total light throughput of the display 204 of the present invention is advantageously increased over the prior art. This in turn creates brighter images on the display 204 for the viewer.

Also note that the purpose of asserting an off-state between times $t_4$ and $t_5$ is to ensure that the pixels 400 in each row 504 of display 204 modulate the L1 data for the same amount of time. For example, if the off-state was not asserted between times $t_4$ and $t_5$ and the DLS 206 was turned off, as it is between times $t_5$ and $t_6$ (described below), then the pixels 400 in each row 504(0-*r*) would modulate light for different amounts of time based on their respective L1 data. Accordingly, asserting the off-state between times $t_4$ and $t_5$ ensures that the L1 bits in each sub-frame 502(*r*), 502(*g*), and 502(*b*) are asserted on their associated pixels 400 for an amount of time equal to the bit's time-weighted significance.

At time $t_5$, the storage elements 402 in the pixels 400 in row 504(0) are loaded with a first shorter bit S0 and the value of the first shorter bit S0 is asserted on their respective pixel electrodes 404. Similarly, between times $t_5$ and $t_6$, which define a fourth loading period, the storage elements 402 in the pixels 400 in the remaining rows 504(1-*r*) are loaded with S0 bits such that the value of those S0 bits are asserted on their respective pixel electrodes 404. The value of each S0 bit is asserted on a pixel 400 until a subsequent bit is loaded into the storage element 402 of the pixel 400. Unlike the L0 and L1 bit planes, each S0 bit has a time-weighted significance (represented by light modulation bar 514) that is less than the duration of the fourth loading period between $t_5$ and $t_6$.

DLS indicator 506 indicates that DLS 206 is turned off during the fourth loading period between times $t_5$ and $t_6$. DLS 206 is turned off during this period so that the S0 bits do not modulate any light while S0 bits are being loaded into the pixels 400 of display 204. Permitting DLS 206 to be turned on between times $t_5$ and $t_6$ would cause light to be modulated by the S0 data loaded into pixels 400 in some rows 504 for a greater amount of time than the time-weighted significance of the associated S0 bit. However, once all S0 bits are loaded, then DLS 206 is turned on between times $t_6$ and $t_7$ such that the pixels 400 containing S0 data modulate light from DLS 206 for an amount of time equal to the significance of the S0 bit plane; which is represented by the light modulation bars 514.

At time $t_7$, the storage element 402 in each pixel 400 in row 504(0) is loaded with a second shorter bit S1 and the value of the second shorter bit S1 is asserted on the associated pixel electrode 404. Similarly, between times $t_7$ and $t_8$, which define a fifth loading period, the storage elements 402 of the pixels 400 in the remaining rows 504(1-*r*) are loaded with S1 bits such that the value of those S1 bits are asserted on their respective pixel electrodes 404. Like shorter bits S0, each S1 bit has a time-weighted significance (represented by modulation bar 516) that is less than the duration of the fifth loading period between times $t_7$ and $t_8$.

Like for bit S0, DLS indicator 506 indicates that DLS 206 is turned off during the fifth loading period between times $t_7$ and $t_8$. DLS 206 is turned off during this period so that the S1 bits do not modulate any light while the S1 bits are being loaded into the pixels 400 of display 204 to prevent modulation errors. However, once all S1 bits are loaded, then DLS 206 is turned on between times $t_8$ and $t_9$ such that the pixels 400 containing S1 data modulate the light produced by DLS 206 for an amount of time indicated by modulation bars 516, which is equal to the time-weighted significance of the S1 bit plane.

Next, between times $t_9$ and $t_{10}$, a third shorter bit S2 is loaded into the storage element 402 of each pixel 400 in each of rows 504(0-*r*). The time between times $t_9$ and $t_{10}$ define a sixth loading period. Like shorter bits S0 and S1, each S2 bit has a time-weighted significance (represented by light modulation bars 518) that is less than the duration of the sixth loading period between times $t_9$ and $t_{10}$. DLS indicator 506 also indicates that DLS 206 is turned off between times $t_9$ and $t_{10}$. Once all S2 bits are loaded, then DLS 206 is turned on between times $t_{10}$ and $t_{11}$ such that the pixels 400 containing S2 data modulate the light produced by DLS 206 for a time indicated by modulation bars 518. Like before, the duration between times $t_{10}$ and $t_{11}$ corresponds to the time-weighted significance of each S2 bit.

Next, between times $t_{11}$ and $t_{12}$ another off-state is asserted on the pixels 400 in rows 504(0-*r*). In particular, at time $t_{11}$, the storage element 402 of each pixel 400 in row 504(0) is loaded with a bit having an off-state value (represented as a "0"). Similarly, between times $t_{11}$ and $t_{12}$, which define a seventh loading period, the storage elements 402 in the pixels 400 in the remaining rows 504(1-*r*) are also loaded with bits having an off-state value such that off states are asserted on their respective pixel electrodes 404. Again, the asserted off-states are indicated by black off-state bars 520 The value of each off-state bit is asserted on a pixel 400 until a subsequent bit is loaded into the storage elements 402 of pixels 400 in rows 504(0-*r*). Finally, the duration between times $t_{11}$ and $t_{12}$ can be fixed or arbitrary. As indicated by DLS indicator 506, DLS 206 is also turned off between times $t_{11}$ and $t_{12}$. In the present embodiment, the seventh loading period between times $t_{11}$ and $t_{12}$ is equal in duration to the loading period between times $t_{12}$ and $t_{13}$.

The off state is asserted and DLS 206 is turned off during times $t_{11}$ to $t_{12}$ so that the S2 bits do not modulate a greater amount of light than their time-weighted significance while the off-state bits are being loaded. Modulation error would also occur if the L0 bits in green sub-frame 502(*g*) were loaded starting at time $t_{11}$ without an off-state being asserted.

Again, because off-state bits are used to assert an off-state between $t_{11}$ and $t_{12}$, some of the mapped data bits that data mapper 302 generates and outputs to data planarizer 304 will be off-state bits. Accordingly, this second bit plane of off-state bits also form part of the data assertion sequence of the present invention. As will be discussed in greater detail below, data mapper 302 generates an off-state bit for each longer-to-shorter bit transition and for every shorter-to-longer bit transition occurring within and between sub-frames 502(*r, g,* and *b*) of a frame.

Time $t_{12}$ indicates the end of sub-frame 502(*r*) and the beginning of sub-frame 502(*g*). The same bit planes are written to the pixels 400 in the rows 504(0-*r*) during green sub-frame 502(*g*) and blue sub-frame 502(*b*), except that the bits written during those sub-frames correspond to green display data and blue display data, respectively, rather than red display data. In other words, the data assertion sequence is the same between sub-frames 502(*r, g, b*). In the embodiment shown in FIG. 5, bits L0, L1, S0, S1, S2 of green display data and two off-state bits would be written to the pixels 400 in rows 504(0-*r*) during sub-frame 502(*g*) in the same manner as they were during red sub-frame 502(*r*). Blue data would also be written to pixels 400 in rows 504(0-*r*) during the blue sub-frame 502(*b*). Accordingly, between times $t_{12}$ and $t_{13}$, first longer bits L0 for green sub-frame 502(*g*) are loaded into the storage elements of pixels 400 in rows 504(0-*r*) of display 204. Again, the time between times $t_{12}$ and $t_{13}$ define a first loading period for sub-frame 502(*g*). Like in sub-frame 502(*r*), DLS 206 is turned on from time $t_{12}$ through time $t_{13}$ until the first shorter bit is loaded in sub-frame 502(*g*).

It should be noted that the loading period required to load data into a pixel 400 in each of rows 504(0-*r*) will generally be constant within a sub-frame 502 and throughout the entire frame. Accordingly, in the present embodiment, the first loading period between times $t_0$ and $t_1$, the second loading period between times $t_2$ and $t_3$, the third loading period between times $t_4$ and $t_5$, the fourth loading period between times $t_5$ and $t_6$, the sixth loading period between times $t_7$ and $t_8$, the seventh loading period between times $t_9$ and $t_{10}$, and the eighth loading period between times $t_{11}$ and $t_{12}$ are all equal in duration. However, the present invention is also applicable to systems where the loading times vary between bit planes.

Driving scheme 500 will now be described utilizing the components of display driver 200 discussed above in FIGS. 2 and 3. Display driver 200 receives display data via data input terminal set 210, and the display data is transferred to data formatter 218. The display data received via input terminal set 210 is, for example, 4-bit binary display data for each color (i.e., 12 bits total per pixel). Data formatter 218 receives the 4-bit binary display data, and via data mapper 302, maps the 4-bit binary display data into 7-bit mapped display data containing bits L0, L1, S0, S1, and S2, and two off-state bits, as shown in FIG. 5. As stated above, if an off-state can be selectively asserted on the pixels 400 of display 204 without writing off-state bits, then data mapper 302 would not create two off-state bits in the mapped data. Data mapper 302 transmits the mapped display data to data planarizer 304. Data planarizer 304 planarizes the mapped display data according to bit plane in no particular order and outputs the display data by bit plane onto buffer input lines 226.

DIOC 222 asserts control signals on buffer control lines 232, which cause the planarized data being output by data planarizer 304 to be loaded into one of frame buffers 220(A) and 220(B) via the buffer's respective input terminal set. Accordingly, assuming frame buffer 220(B) is selected, planarized, mapped display data is loaded into frame buffer 220(B). When data planarizer 304 has planarized a full frame of data, it can optionally assert a signal on signal line 228 to indicate to DIOC 222 that it has completed planarizing a frame of display data.

DIOC 222 also instructs frame buffer 220(A), which was previously loaded with a frame of data, to output planes of mapped display data onto display data lines 230 according to the data assertion sequence programmed in DIOC 222. For example, during times $t_0$-$t_1$, DIOC 222 would instruct frame buffer 220(A) to output L0 bits for each row 504(0-*r*) according to some sequence onto display data lines 230. Similarly, during times $t_2$ to $t_3$, DIOC 222 would instruct frame buffer 220(A) to output L1 bits for each row 504(0-*r*) onto display data lines 230. DIOC 222 would repeat this process for the remaining bits of the mapped display data, including the off-state bits asserted during times $t_4$ to $t_5$ and $t_{11}$ to $t_{12}$. DIOC 222 can load data into frame buffer 220(B) and output data from 220(A) simultaneously, such as by using the same control signals (e.g., memory addresses, etc.) to access each frame buffer 220(A) and 220(B).

DIOC 222 also controls loading data into the storage elements of the pixels 400 of display 204 by asserting control signals onto display control lines 234. As a bit plane of data associated with a particular row 504 of pixels 400 is output onto display data lines 230, DIOC 222 asserts control signals, such as a row address, onto display control lines 234 such that the bit plane of mapped display data is loaded into the pixels in the correct one of rows 504 in display 204. As stated above, the control signals used to address the display 204 could be the same control signals used to access frame buffers 220(A) and 220(B). For example, the same memory addresses used to access frame buffers 220(A) and 220(B) could be used to uniquely enable rows 504 of pixels 400 in display 204.

Note that DIOC 222 will be programmed to know which bit planes stored in frame buffers 220(A) and 220(B) correspond to "longer bit" planes, to "shorter bit" planes, and to "off-state" bit planes. As stated above, longer bit planes are composed of data bits, whether arbitrarily-weighted or binary-weighted, that have a time-weighted significance greater than or equal to the time required to load the particular bit plane into the pixels in the rows 504 of display 204. Conversely, shorter bit planes are those where the bits in the bit plane have a time-weighted significance that is less than the time required to load the particular bit plane into the pixels in the rows 504 of display 204.

To load the display between times $t_0$ and $t_1$, DIOC 222 asserts control signals on frame buffer 220(A) causing frame buffer to assert L0 bits onto display data lines 230 sequentially according to the order that the rows 504(0-*r*) are loaded. Near the same time, DIOC 222 asserts the corresponding row addresses on display control lines 234 such that display data asserted on display data lines 230 would be latched into enabled row 504 of pixels 400 in display 204. Subsequently, DIOC 222 would load the L1 bits, the first off-state bits, S0 bits, S1 bits, S2 bits, and then the second off-state bits, according to the same process at the appropriate times within the red sub-frame 502(*r*). DIOC 222 would repeat this data assertion sequence for green and blue mapped display data in the subsequent green sub-frame 502(*g*) and blue sub-frame 502(*b*), respectively.

DIOC 222 also asserts state signals on DLS controller 224 via state line 236. For example, where DIOC 222 is loading longer bit data to the pixels 400 of display 204 and display 204 is asserting longer bit data, then DIOC 222 is operative to assert a state signal on DLS controller 224 via state line 236 that indicates to DLS controller 224 that DLS 206 should be turned on. Accordingly, during times $t_0$ to $t_5$ in FIG. 5, DIOC 222 asserts a state signal on DLS controller 224 that indicates that DLS 206 should be turned on. Note that DIOC 222 also indicates to DLS controller 224 that DLS 206 should be turned on when a longer-bit to shorter-bit transition off-state is asserted between times $t_4$ and $t_5$. Conversely, when DIOC 222 is loading shorter bit data into the pixels 400 of display 204, then DIOC 222 asserts a state signal on DLS controller 224 that indicates DLS 206 should be turned off. Accordingly, DIOC 222 indicates to DLS controller 224 that DLS 206 should be turned off between times $t_5$ to $t_6$, $t_7$ to $t_8$, and $t_9$ to $t_{10}$. DIOC 222 also asserts a state signal on DLS controller 224 to turn DLS 206 on once the shorter bits have all been loaded into the rows 504 that indicates to DLS controller 224 to turn DLS 206 on. Accordingly, DIOC 222 indicates to DLS controller 224 to turn DLS 206 on during times $t_6$ to $t_7$, $t_8$ to $t_9$, and $t_{10}$ to $t_{11}$. Finally, DIOC 222 indicates to DLS controller 224 to turn DLS 206 off during a shorter-bit to longer-bit transition off-state (i.e., prior to a colored sub-frame transition) such as between times $t_{11}$ to $t_{12}$.

DLS controller 224 controls the operation of DLS 206 by sending DLS 206 control signals via DLS control line 238. When DLS 206 is supposed to be turned on, DLS controller 224 causes DLS 206 to turn on the appropriate color of light. For red sub-frame 502(*r*), DLS 206 generates red light, for green sub-frame 502(*g*), DLS 206 generates green light, and for blue sub-frame 502(*b*), DLS 206 generates blue light. When DLS 206 is supposed to be off, DLS controller 224 causes DLS 206 to turn off. DIOC 222 and DLS controller 224 are synchronized by timing signals output by timing generator 216 and Vsync signals received via Vsync input 212. Optionally, DLS controller 224 can modulate DLS 206 on and off during periods that DLS 206 is supposed to be turned on as will be described in further detail below.

It should also be noted that DLS controller 224 does not necessarily need state signals from DIOC 222 to operate. For example, if DLS controller 224 were programmed with the same data assertion sequence as DIOC 222, then DLS controller 224 could turn DLS 206 on an off according to the light modulation sequence shown by indicator 506 in FIG. 5 by utilizing just timing signals from timing generator 208 and Vsync signals received via Vsync input 212.

In summary, DIOC 222 causes frame buffers 220(A) and 220(B) to receive and store a plurality of data bits (e.g., bit planes) which are each associated with one of the pixels 400 in the display 204. DIOC 222 then loads the bits in a bit plane on the pixels 400 within a loading period and indicates to DLS controller 224 to turn on DLS 206 prior to the end of the loading period when each of the loaded bits has a time-weighted significance such that it is stored in a storage element 402 and DLS 206 is turned on for a time greater than or equal to the loading period. Alternatively, DIOC 222 instructs DLS controller 224 to turn DLS 206 off when each of the bits in the bit plane has a time-weighted significance such that it is stored in the storage element 402 and DLS 206 is turned on for a time less than the duration of the loading period.

The present invention provides several advantages over the prior art. First, the present invention increases the light throughput of display 204 over the prior art because the loading and light modulation times of display 204 overlap. In other words, for bits having a time-weighted significance greater than or equal to a predetermined loading time, the light source 206 does not have to be turned off while those bits are written to the pixel array of display 204. Because the light source is not turned off during all bit load times, as was the case in the prior art, the actual percentage of time during the frame that DLS 206 is turned on increases. This increases in the overall light throughput of the display 204. Note that the duration that DLS 206 is turned on during the sub-frame 502(*r*) is greater than the combined time-weighted significance of all the bits used to modulate light impinging on a pixel, not including the two off-state bits.

Another advantage of the present invention is that pixels 400 are single-latch pixels. As described above, single latch pixels are have reduced manufacturing costs and complexity. In addition, more single latch pixels can be packaged in the same chip area as prior art pixels with more circuitry, such as dual latches.

The advantages of the loading and modulation scheme 500 become even more apparent when the pixels 400 of display 204 are driven with mapped data words that have a large number of bits, such as ten or more. For example, in a system where each pixel 400 is driven with a mapped display data word having ten (10) total bits including 6 longer bits (L0-L5) and 4 shorter bits (S0-S3), then DLS 206 would be turned off for only five loading periods. For this data word, DLS 206 would remain on while the six longer bits L0-L5 and the first off-state was written to the pixels of display 204. DLS 206 would only turn off during the loading periods for shorter bits S0-S3 and while the final off-state was asserted prior to pixel data for a next colored sub-frame (e.g., sub-frame 502(*g*)) being loaded and asserted on the pixels 400. In contrast, if the same pixel 400 were driven with a 10-bit data word according to the prior art method, the light source 206 would be turned off for a total of 10 loading periods, one for each bit in the 10-bit data word. Therefore, according to this 10-bit example, the present invention reduces the off-time of the light source by 50% within a frame or sub-frame over the prior art scheme 100.

Note that the present invention provides the greatest light throughput when all the shorter bit planes are written either before or after all the longer bit planes. However, light throughput of the display 204 can be increased even if the longer bit planes and the shorter bit planes are not written to consecutively. Additionally, sequentially writing all the longer bit planes also increases operating efficiency, because the need to write off states to the display is greatly reduced.

Figure 6A:
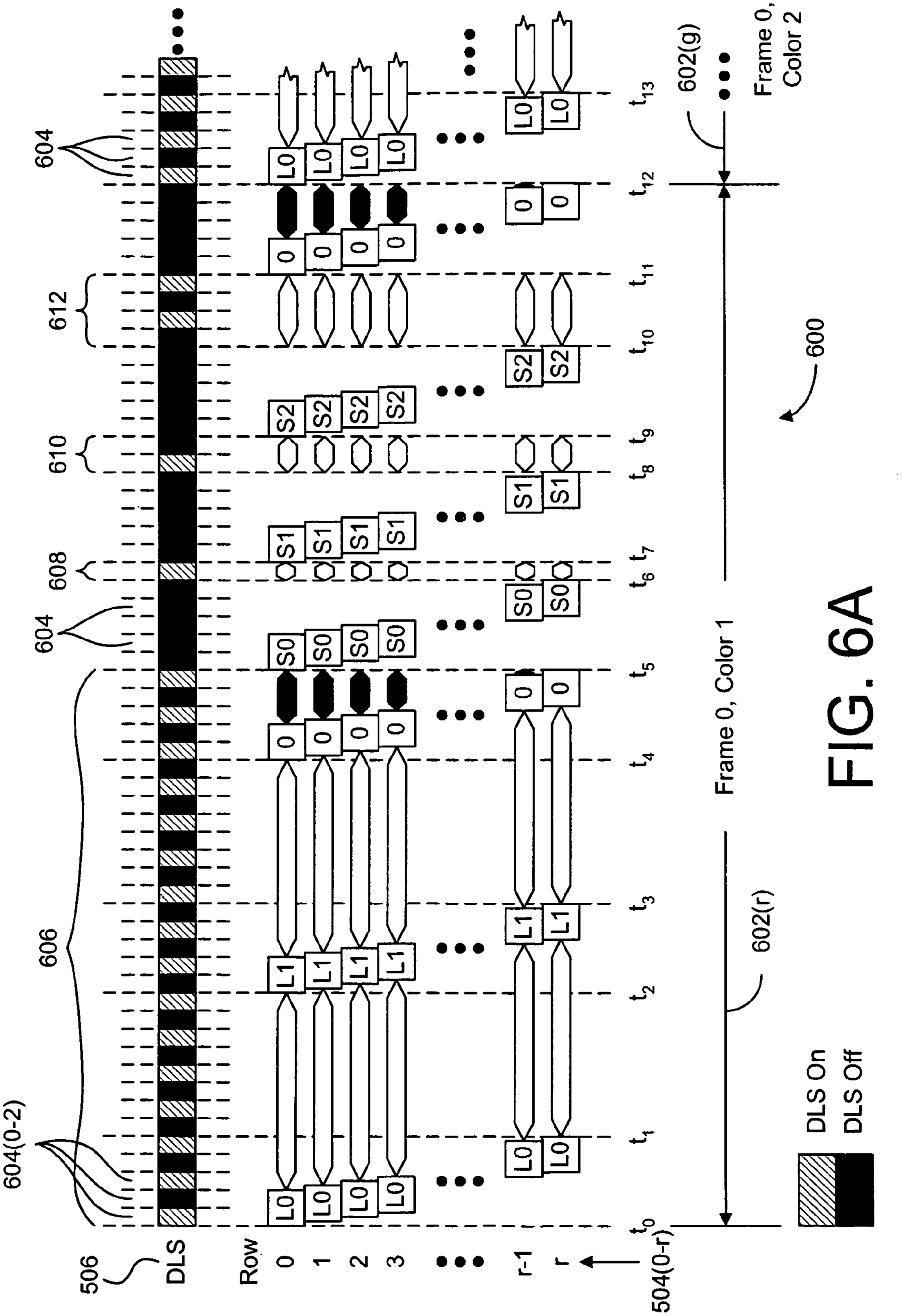
FIG. 6A is a diagram showing a light source modulation scheme for conserving power according to the present invention.

FIG. 6A is a diagram showing a light source modulation scheme 600 for conserving power according to the present invention. According to light source modulation scheme 600, display data is asserted on the pixels 400 of display 204 according to the loading and modulation scheme 500 shown in FIG. 5. Accordingly, each frame time (labeled "Frame 0" in FIG. 6A) of display 204 is divided into three sub-frames 602(*r*), 602(*g*), and 602(*b*) consistent with a field-sequential driving system. However, according to scheme 600, DLS controller 224 modulates DLS 206 during sub-frames 602(*r, g, b*) causing DLS 206 to use less power.

DLS controller 224 operates as follows to modulate DLS 206. When DIOC 222 asserts a state signal on DLS controller 224 via state line 236 that indicates DLS 206 is supposed to be on, DLS controller 224 is operative to modulate DLS 206 between an on state (where DLS 206 emits light) and an off-state (where DLS 206 does not emit light) while DIOC 222 asserts an on-state signal on state line 236. In other words, DLS controller 224 periodically turns DLS 206 off during times when DIOC 222 indicates that DLS 206 should be on. This produces a lower brightness display image over the frame of display data when compared to the full brightness display image produced according to scheme 500. However, where DIOC 222 asserts a state signal on DLS controller 224 that indicates DLS 206 is supposed to be off, DLS controller 224 maintains DLS 206 in an off-state.

DLS indicator 506 indicates how DLS controller 224 modulates the light output of DLS 206 according to the present invention. As DLS indicator 506 shows, the light modulation sequence described by DLS indicator 506 in FIG. 5 has been divided into a plurality of time intervals 604. Accordingly, the light modulation sequence for each of sub-frames 602(*r, g, b*) shown in FIG. 6A includes a predetermined number of time intervals 604, including a plurality of on time intervals (where DIOC 222 indicates that DLS 206 is supposed to be turned on) and a plurality of off time intervals (where DIOC 222 indicates that DLS 206 is supposed to be turned off). In the present embodiment, time intervals 604 are defined by the timing signals generated by timing generator 208 and asserted on timing input 216. However, time intervals of greater or shorter frequency can be generated by some other timing means if desired.

In FIG. 6A, the on time intervals 604 in sub-frame 602(*r*) are represented by groups of time intervals 606, 608, 610, and 612. The remaining time intervals 604 in sub-frame 602(*r*), such as the time intervals between times $t_5$ and $t_6$, $t_7$ and $t_8$, etc. are off time intervals 604 where DLS 206 is turned off. Thus, an on time interval in groups 606, 608, 610, and 612 is still considered to be an on time interval even though DLS 206 may be turned off during that time interval.

DLS controller 204 conserves power by periodically turning DLS 206 off during the on time intervals 604 in sub-frame 602(*r*). As indicated by DLS indicator 506, during groups 606, 608, 610, and 612 of on time intervals 604 in sub-frame 602(*r*), DLS controller 224 turns DLS. 206 on for even-numbered time intervals 604 starting with time interval 604 (0) at the beginning of the frame, and turns DLS 206 off for odd-numbered time intervals 604. In other words, DLS controller 224 modulates DLS 206 between an on- and off-state in sub-frame 602(*r*) every other one of time intervals 604 in groups 606, 608, 610, and 612 of on time intervals 604. To modulate DLS 206 between on- and off-states during groups 606, 608, 610, and 612 of on time intervals 604, DLS controller 224 drives DLS 206 with a pulse-width modulation (PWM) signal via DLS control lines 238, where the PWM signal is coordinated with the time signals generated by timing generator 208 or some other clock defining the time intervals 604.

DLS controller 224 is able to determine even and odd time intervals 604 because it receives timing signals from timing generator 208 as well as Vsync signals from Vsync input 212. For example, DLS controller 224 might use a 2-state internal counter that is reset every Vsync and incremented every time interval 604 (i.e., every timing signal) to determine even and odd time intervals 604. Accordingly, when DLS controller 224 receives a Vsync signal at the start of a frame time (Frame 0 in this case), it begins counting the number of time intervals 604 by counting the number of timing signals generated by timing generator 208. When DLS controller 224 receives an on-state signal from DIOC 222, DLS controller turns DLS 206 on for even time intervals 604 (e.g., even count values) and off during odd time intervals 604 (e.g., odd count values). At the beginning of each full frame (e.g., the start of frame 0), DLS controller 224 resets its internal counter value to zero. DIOC 222 and DLS controllers 224 are synchronized during each frame by the Vsync signals. Accordingly, the light modulation sequence of DLS 206 and the data assertion sequence controlled by DIOC 222 are coordinated and synchronized during each frame of display data.

Figure 6B:
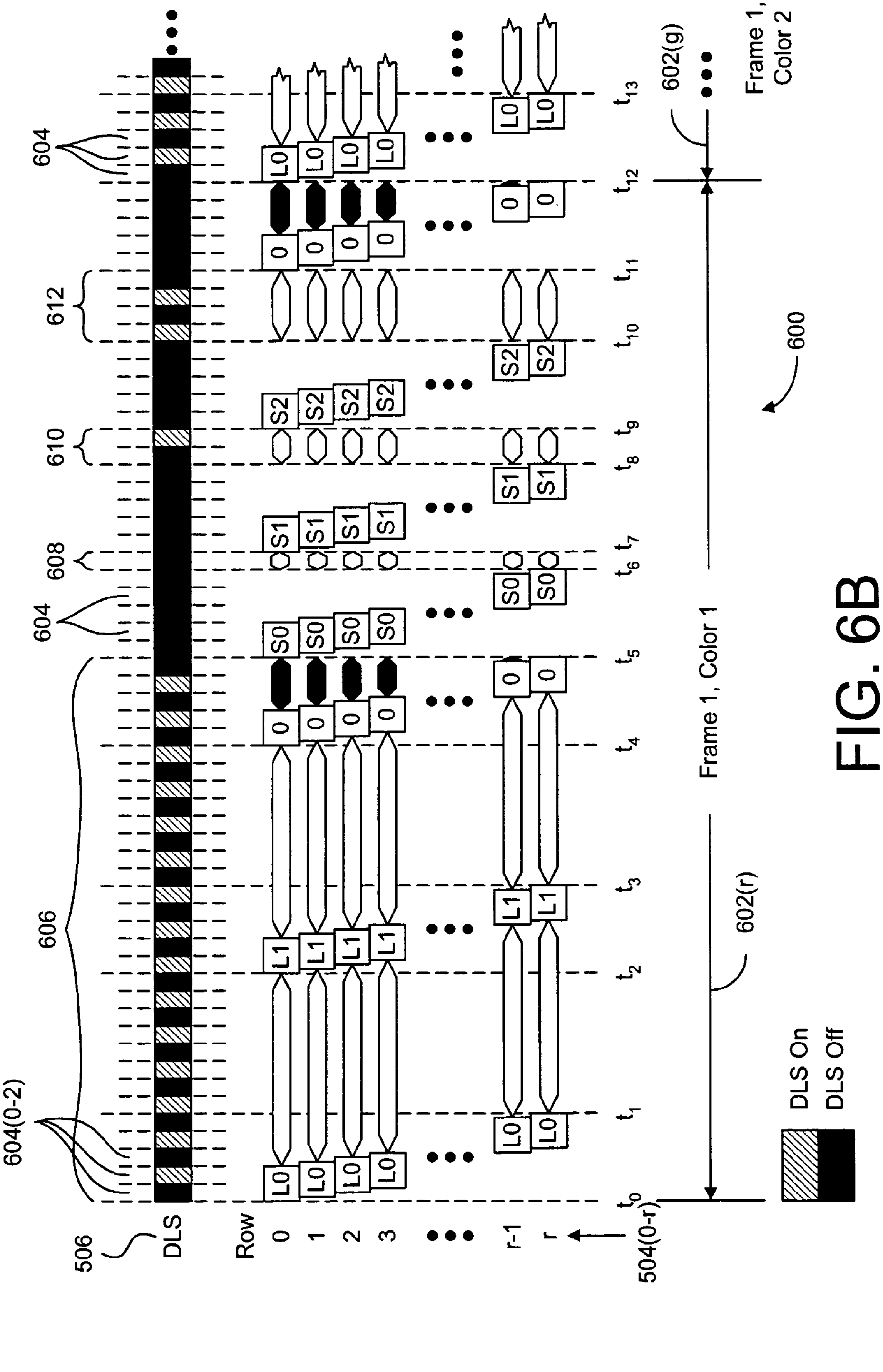
FIG. 6B is a diagram showing the light source modulation scheme of FIG. 6A for a second frame of display data.

FIG. 6B shows the light source modulation scheme 600 of FIG. 6A for a second frame (labeled "Frame 1" in FIG. 6B) of display data. The second frame of display data is written to display 204 according to a second data assertion sequence that is the same as the data assertion sequence shown in FIG. 6A. The second frame time is again broken into three sub-frames 602(*r, g, b*) and a plurality of time intervals 604 equal to the number of time intervals 604 in the first frame shown in FIG. 6A.

During the second frame of power savings scheme 600, DLS controller 224 modulates DLS 206 on and off during different on-time intervals 604 than in the first frame shown in FIG. 6A. Like in FIG. 6A, during groups 606, 608, 610, and 612 of on time intervals 604, DLS controller 224 periodically turns light source 206 off for particular ones of the time intervals 604. However, in the second frame shown in FIG. 6B, DLS controller 224 turns DLS 206 on for odd-numbered time intervals 604 and turns DLS 206 off for even-numbered time intervals 604. Note that in FIG. 6B, DLS indicator 506 indicates that DLS controller 224 turns DLS 206 off for time interval 604(0) and on during time interval 604(1), which is the opposite of FIG. 6A. DLS controller 224 drives all groups 606, 608, 610, and 612 of time intervals 604 during the second frame in the opposite on-off sequence as shown in FIG. 6A. Accordingly, the DLS controller 224 periodically turns light source 206 off during different on time intervals 604 in FIG. 6B than were turned off in FIG. 6A.

During a subsequent third frame, DLS controller 224 would modulate DLS 206 in the same manner as it modulated DLS 206 during the first frame in FIG. 6A. Similarly, during a fourth frame, DLS controller 224 would modulate DLS 206 as shown in FIG. 6B for the second frame. And this cycle would continue while display driver 202 was operating. To accomplish this driving series, DLS controller 224 could use another internal 2-state counter to keep track of whether it was to turn DLS 206 off during even time intervals 604 or odd time intervals 604 in a particular frame.

It should be noted that DLS controller 224 does not restart the modulation sequence of DLS 206 during each group 606, 608, 610, and 612 of on time intervals 604. Rather DLS controller 224 keeps its time interval count value throughout the whole frame time, even if DIOC 222 indicates an off-state. In other words, the internal time interval count value of DLS controller 224 is reset to zero at the beginning of each frame (e.g., upon receipt of a Vsync signal), and is not reset to zero at the beginning of each on-state within the frame. Note this count value is also not reset between sub-frames 602(*r, g*, and *b*). In addition, note that the Vsync signal also instructs DLS controller 224 to change the on-state or off-state value of DLS 206 (e.g., between even and odd) for the first time interval 604(0) from the previous frame.

It should also be noted that according to scheme 600 the pixels 400 in all the rows 504 of display 204 will advantageously modulate the same amount of light over two frames of display data. This is the case because DIOC 222 and DLS controller 224 are synchronized with the Vsync signal received via Vsync input 212 at each frame. Accordingly, DLS controller 224 knows when the first time interval 604 occurs within a frame time and can shift the modulation of DLS 206 (e.g., even to odd between frame 0 and frame 1).

In addition, the inventors have found that the modulation period of DLS 206 should be small compared to the duration of the loading periods for the display data. As shown in FIG. 6B, the modulation frequency of scheme 600 is two time intervals 604, whereas the display loading times between to and $t_1$, $t_2$ and $t_3$, etc. each include five time intervals. Keeping the modulation period of the DLS 206 small (e.g., less than 50%) compared to the duration of the loading periods for the display minimizes differences in the illumination of the different rows 504(0-*r*).

The light source modulation scheme 600 shown in FIGS. 6A and 6B provides the advantage that it conserves power over scheme 500 because DLS 206 is turned on only half as often during a each whole frame time. Light source modulation scheme 600 is therefore beneficial in systems where power needs to be conserved, such as in portable electronic devices, or where excessive heat generation is unwanted because it produces lower brightness display images.

Figure 7A:
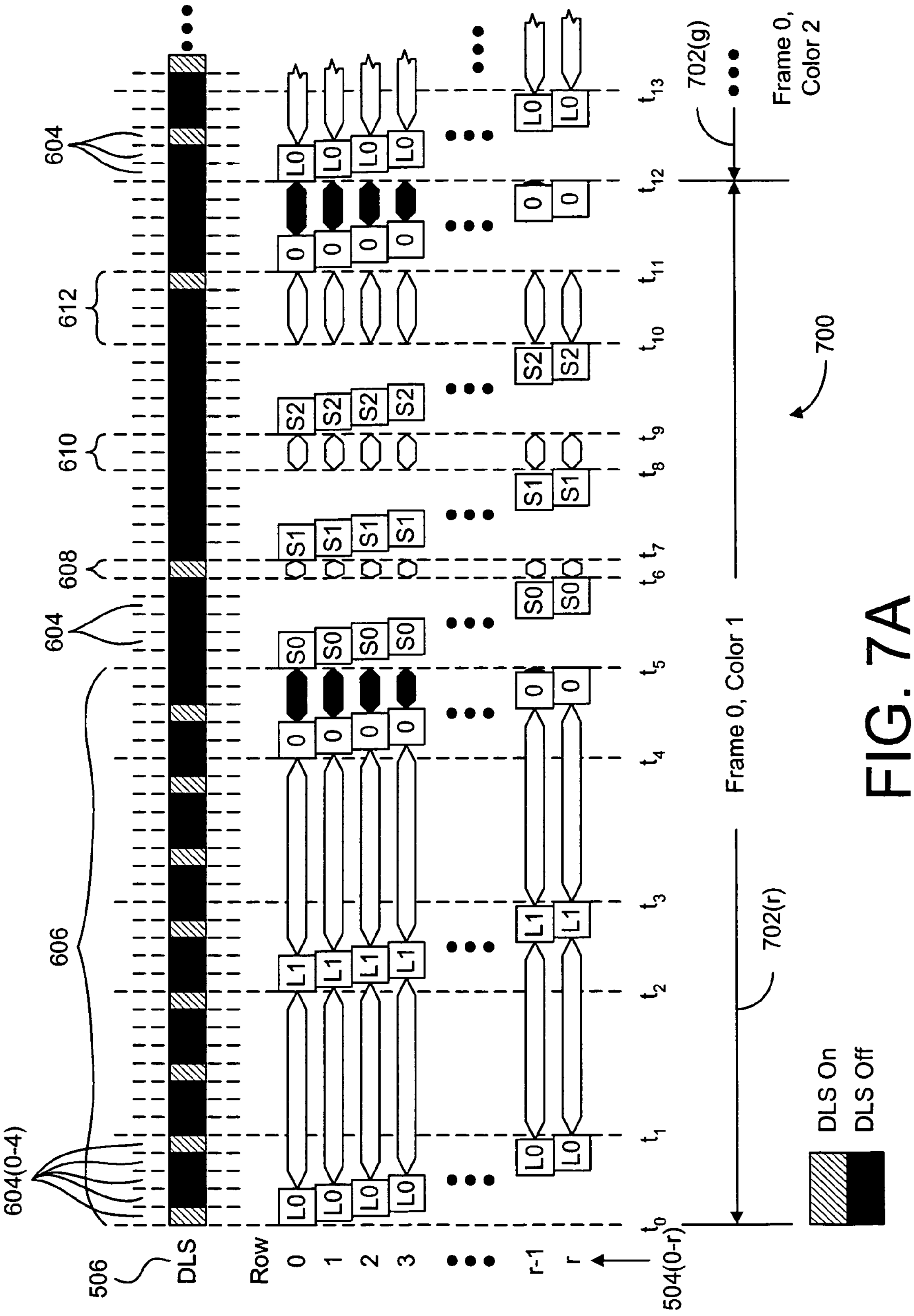
FIG. 7A is a diagram showing another light source modulation scheme for conserving power according to the present invention.
Figure 7B:
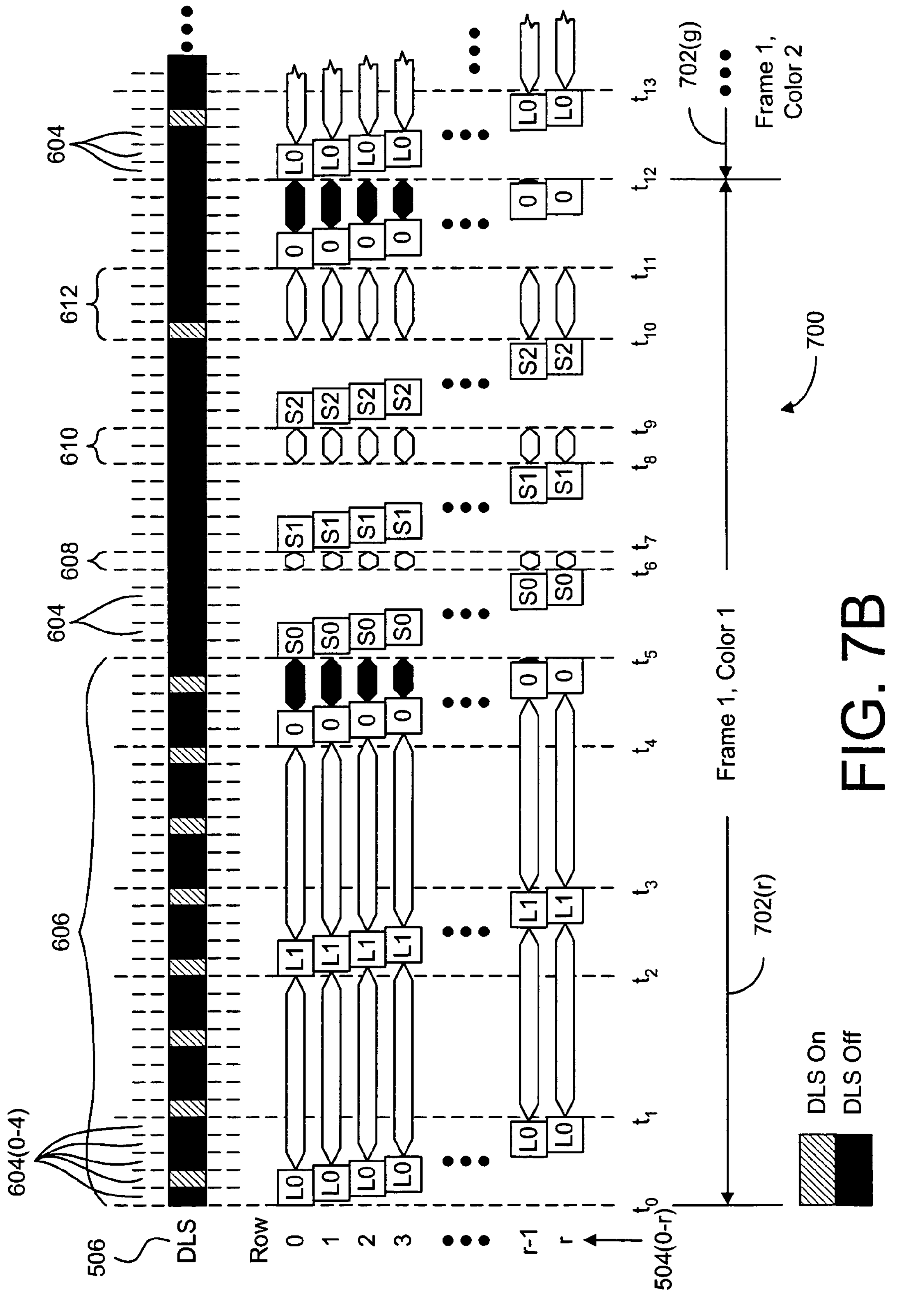
FIG. 7B is a diagram showing the light source modulation scheme of FIG. 7A for a second frame of display data.
Figure 7C:
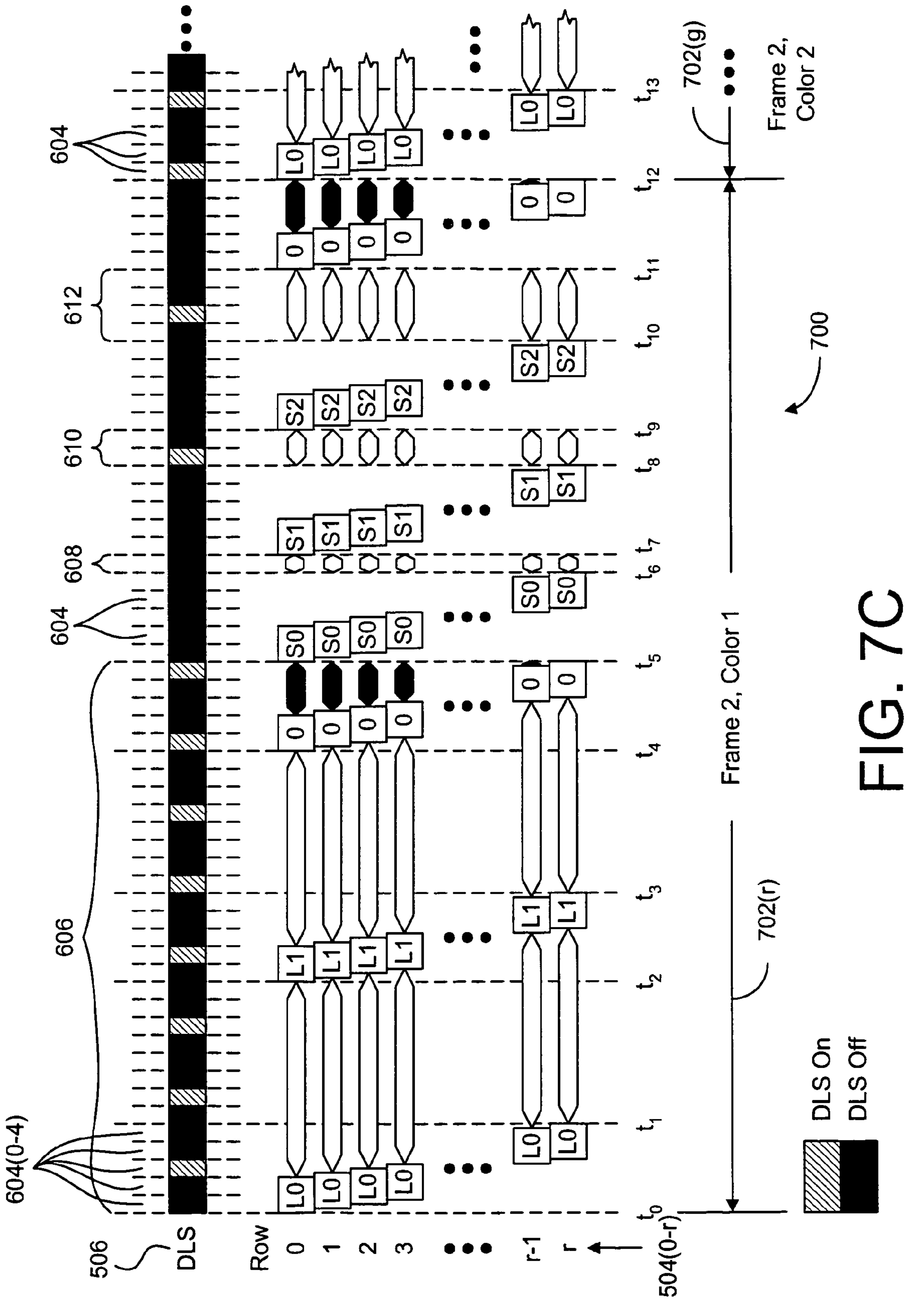
FIG. 7C is a diagram showing the light source modulation scheme of FIG. 7A for a third frame of display data.
Figure 7D:
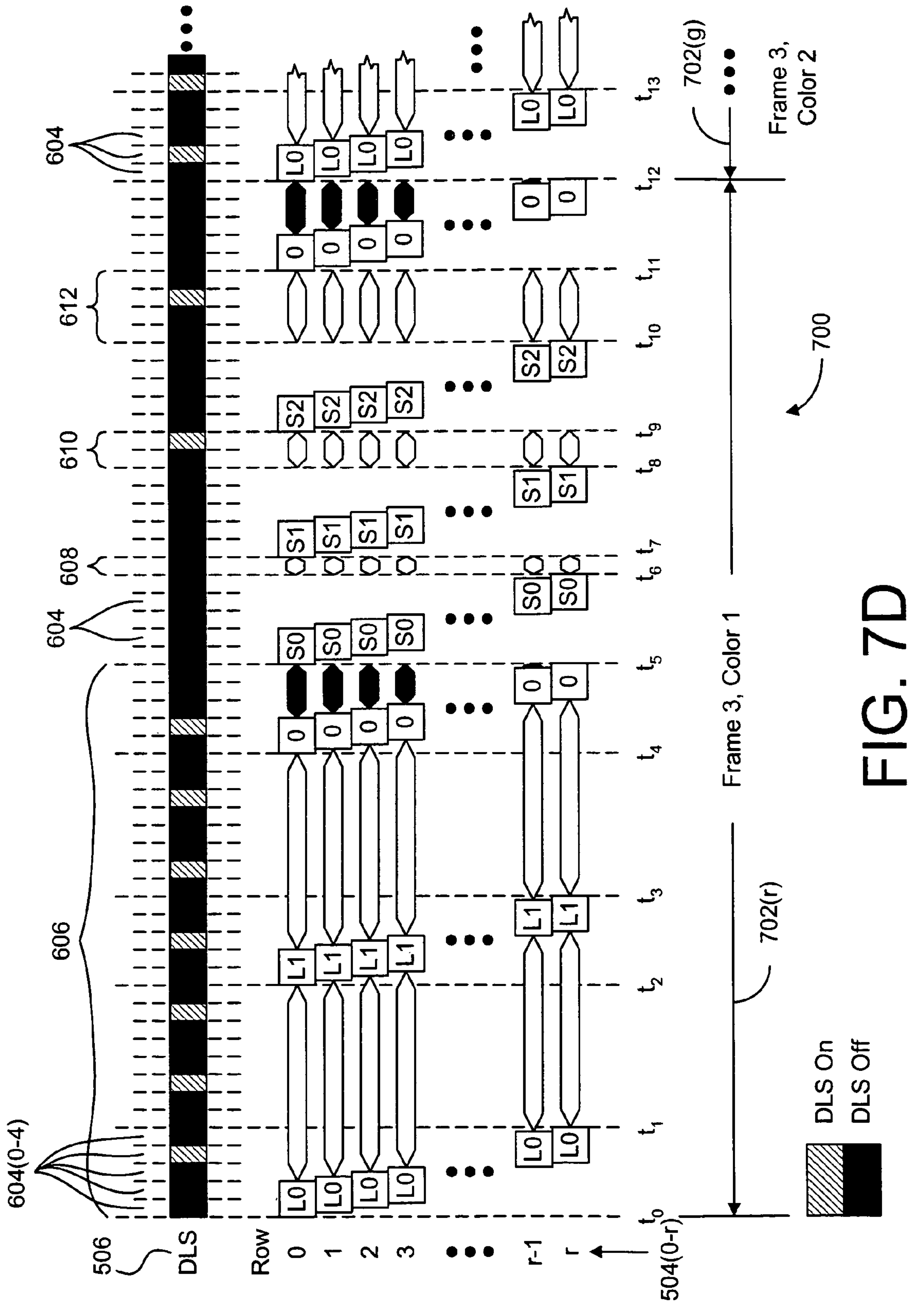
FIG. 7D is a diagram showing the light source modulation scheme of FIG. 7A for a fourth frame of display data.

FIGS. 7A-7D show another light source modulation scheme 700 for conserving power according to the present invention. FIG. 7A shows light source modulation scheme 700 for a first frame time (labeled "Frame 0"), FIG. 7B shows scheme 700 for a second frame time (labeled "Frame 1"), FIG. 7C shows scheme 700 for a third frame time (labeled "Frame 2"), and FIG. 7D shows scheme 700 for a fourth frame time (labeled "Frame 3"). Each frame time in FIGS. 7A-7D is composed of three colored sub-frames 702(*r, g, b*) for red, green, and blue light, respectively. Like FIGS. 6A and 6B, data is loaded into the pixels 400 of display 204 and the pixels 400 are modulated according to loading and modulation scheme 500. Also like light source modulation scheme 600, the frame times of scheme 700 are broken into a plurality of time intervals 604, including groups 606, 608, 610, and 612 of on time intervals 604 where DIOC 222 indicates that DLS 206 should be turned on within red sub-frame 602(*r*).

According to scheme 700, DLS controller 224 modulates DLS 206 with a modulation frequency of four time intervals 604. In particular, DLS controller 224 turns DLS 206 on every fourth time interval 604 during groups 606, 608, 610, and 612 beginning with a first selected on time interval 604. In FIG. 7A, for example, DLS controller 224 turns DLS 206 on every fourth on time interval 604 during groups 606, 608, 610, and 612 beginning with on time interval 604(0) within frame 0. DLS controller 224 then turns DLS 206 off for the following three time intervals 604(1-3), and then back on again during a fifth time interval 604(4). DLS controller 224 modulates DLS 206 in the same manner for all groups 606, 608, 610, and 612 of on time intervals 604 during the remainder of the frame. Note that DLS 206 is on in the on time interval 604 in group 608 between times $t_6$ and $t_7$, but is off during both on time intervals 604 in group 610 between times $t_8$ and $t_9$, even though DIOC 222 is asserting an on-state signal on DLS controller 224. Therefore, in general, DLS controller 224 turns DLS 206 on during only one of every four on time intervals 604 when DIOC 222 is asserting an on-state signal on DLS controller 224 via state line 236.

FIG. 7B shows that DLS controller 224 has shifted the modulating sequence of DLS 206 by one time interval 604. Note that in the second frame ("Frame 1"), DLS controller 224 again turns DLS 206 on one out of every four time intervals 604 during groups 606, 608, 610, and 612 of on time intervals 604. However, in the second frame, DLS controller 224 turns DLS 206 on for the first time during the frame in the second time interval 604(1), and then turns DLS 206 off for three time intervals 604, and so on. Similarly, during FIG. 7C, DLS controller 224 shifts the modulation sequence by another time interval 604. In particular, in the third frame ("Frame 2") DLS controller 224 turns DLS 206 on during every fourth time interval 604, starting with a third time interval 604(2) in the frame, when DIOC 222 indicates that DLS 206 should be turned on. In FIG. 7D, which shows a fourth frame time, DLS controller 224 turns DLS 206 on every fourth time interval 604, starting with the fourth time interval 604(3) in the frame time. Like above, DLS controller 224 could use a 4-state counter, reset each Vsync and incremented each time interval 604, to determine during which time intervals 604 that DLS 206 should be turned on when DIOC is asserting an on-state signal. Again note that the modulation frequency of DLS 206 (i.e., 4 time intervals 604) is less than the duration of the loading periods for the display 204.

According to scheme 700, the pixels 400 in all the rows 504 of display 204 will modulate the same amount of light over four complete frame times. Again, the data assertion sequence performed by DIOC 222 and the light modulation sequence generated by DLS controller 224 are synchronized with the Vsync signal received via Vsync input 212 at each full frame such that DLS controller 224 knows when the first time interval 604(0) occurs within a frame time and can determine which time interval 604 that it should first turn on DLS 206 during the first group 606 of on time intervals 604. For example, in the current embodiment, DLS controller 224 might use a another 4-state internal counter that is incremented every Vsync signal to determine when to turn DLS 206 on for the first time interval 604 within a frame.

Like in scheme 600, DLS controller 224 does not restart the modulation sequence of DLS 206 each time DIOC 222 indicates that DLS 206 is supposed to be turned on within a frame time. Rather DLS controller 224 keeps its timing throughout the whole frame, even if DIOC 222 indicates an off-state. For example, note in FIG. 7A that DLS 206 is turned on during the first time interval 604(0) in red sub-frame 602(*r*), but that DLS 206 is turned off in the first time interval 604 at the start of green sub-frame 702(*g*) (i.e., immediately after $t_{12}$). This is because, DLS controller 224 continues modulating DLS 206 according to the same sequence that it established at the beginning of the frame after receiving the Vsync signal.

Light source modulation scheme 700 shown in FIGS. 7A-7D conserves even more power than light source modulation scheme 600 shown in FIGS. 6A and 6B. In particular, scheme 700 advantageously conserves power because DLS 206 is turned on only one-fourth of the total on-time within a frame of display data. Accordingly, each pixel 400 of display 204 is modulated with the same amount of light over four frames of display data. Light source modulation scheme 600 is therefore beneficial in systems where power needs to be conserved, such as in portable electronic devices, or where excessive heat generation is unwanted.

Light modulation schemes 600 and 700 can be generalized as follows. DLS controller 224 is operative to modulate DLS 206 between an on-state and an off-state during periods of the frame time when DLS 206 should be turned on. During these times, DLS controller 224 can turn DLS 206 on every $x^{th}$ one of the on time intervals 604 (e.g., in groups 606, 608, 610, and 612), where x is an integer greater than or equal to one. Where x is greater than one, then DLS controller 224 can turn DLS 206 off during all other on time intervals within the groups 606, 608, 610, and 612 of the on time intervals 604. Accordingly, for a first time period and for a group (e.g., group 606) of time intervals 604 where DIOC 222 indicates an on-state for DLS 206, DLS controller 224 turns DLS 206 on every $x^{th}$ time interval within that group, starting with a first selected one of the time intervals 604. Then during a second frame for the same group of time intervals, DLS controller 224 turns DLS 206 on every $x^{th}$ time interval within that group, starting with a time interval 604 that is shifted one time interval 604 from the first selected time interval 604 in the first frame. This shifting process then continues for x frames to equalize the amount of light modulated by the pixels in all rows 504 of the display.

The methods of the present invention will now be described with respect to FIGS. 8-10. For the sake of clear explanation, these methods are described with reference to particular elements of the previously described embodiments that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular element(s) that perform(s) any particular function(s). Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 8:
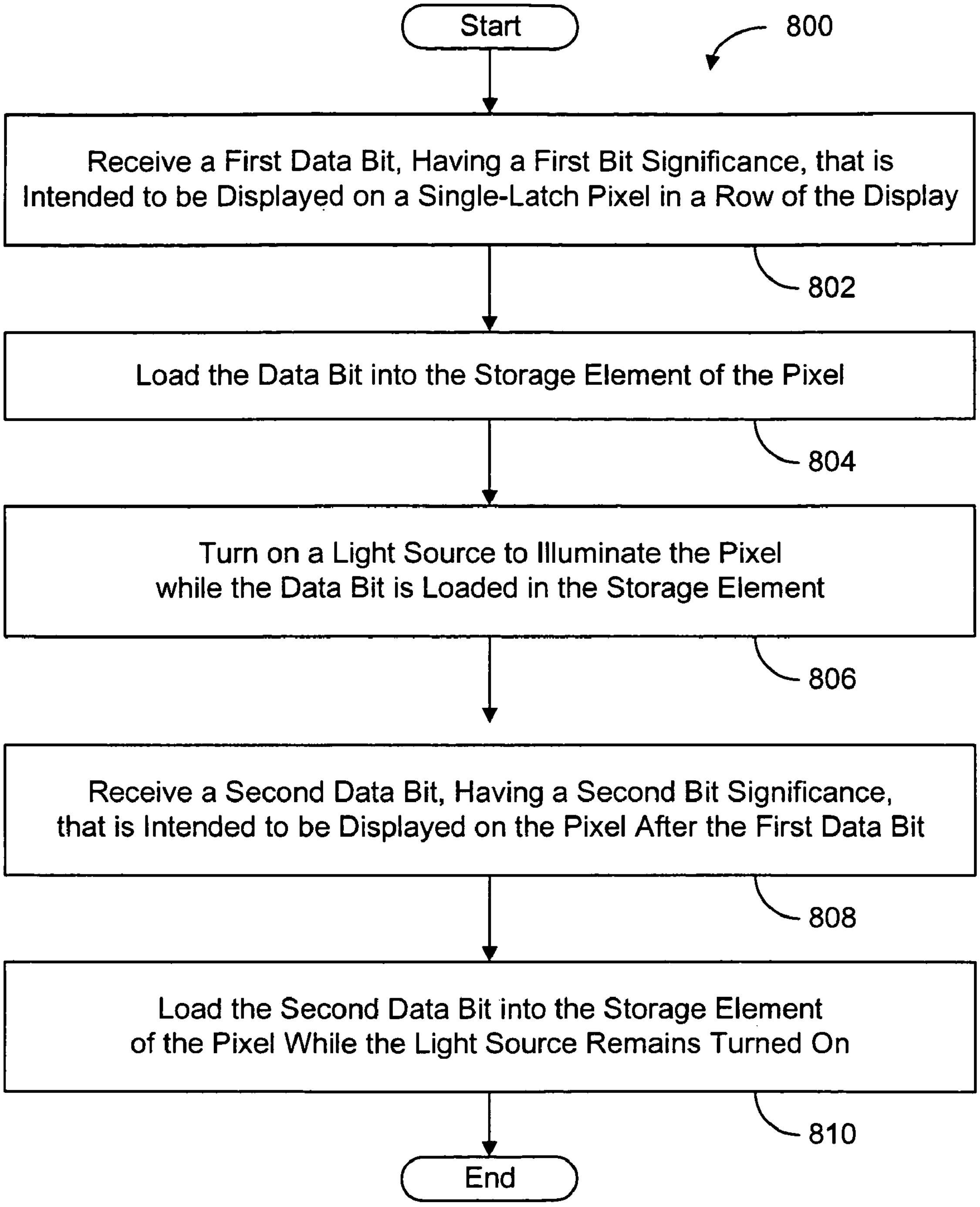
FIG. 8 is a flowchart summarizing one method for loading data into and modulating a display according to the present invention.

FIG. 8 is a flowchart summarizing one method 800 for loading data into and modulating a display 204 according to the present invention. In a first step 802, one of frame buffers 220A and 220B receive a first data bit (e.g., L0, L1, S0, S1, S2, etc.) that has a first bit significance and is intended to be displayed on a pixel 400 in the display 204. Then, in a second step 804, DIOC 222 asserts control signals on buffer control lines 232 and display control lines 234 such that the data bit is output from frame buffer 220(A) or 220(B) and is loaded into the associated pixel 400 in display 204. The data bit is loaded into the storage element 402 of pixel 400. Because the storage element 402 is directly connected to the pixel electrode 404, the value of the loaded data bit controls the voltage asserted on pixel electrode 404 whenever the data bit is loaded in storage element 402. Next, in a third step 806, DLS controller 224, responsive to an on-state signal received from DIOC 222 on line 236, turns DLS 206 on by asserting control signal(s) on DLS control lines 238 while the data bit is loaded in the storage element 402. Then in a fourth step 808, one of frame buffers 220(A) or 220(B) receives a second data bit associated with the pixel 400, and in a fifth step 810, DIOC 222 asserts control signals on display control lines 234 to load the second data bit into the storage element 402 of pixel 400 such that the value of the second data bit controls the voltage asserted on the pixel electrode 404 of pixel 400. DLS controller 224 keeps light source 206 turned on while the second data bit is loaded into the storage element 402 of pixel 400.

Figure 9:
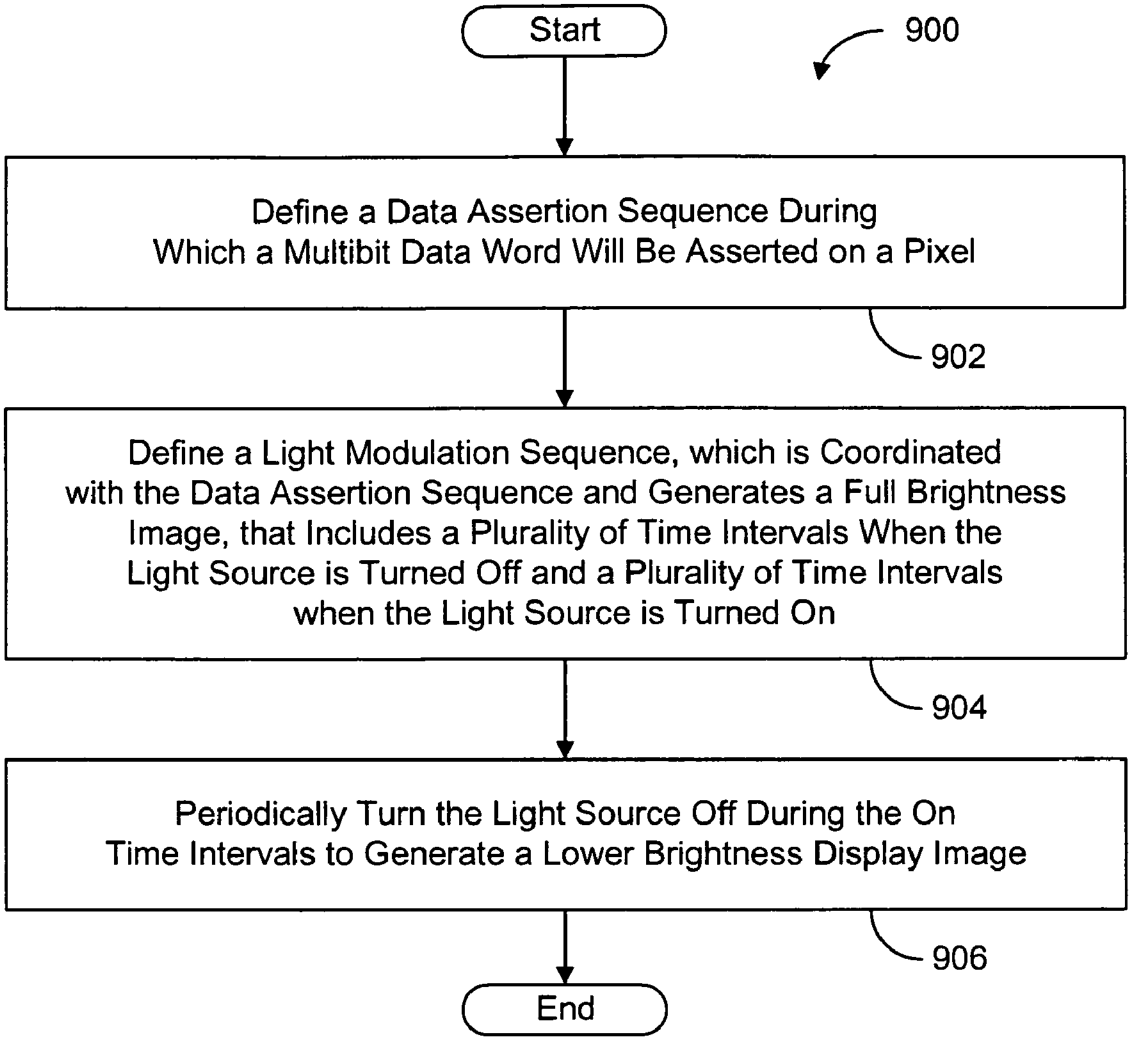
FIG. 9 is a flowchart summarizing one method of modulating a light source to conserve power according to the present invention.

FIG. 9 is a flowchart summarizing one method 900 for modulating the light source 206 to conserve power according to the present invention. In a first step 902, DIOC 222 defines a data assertion sequence (e.g., bit sequence L0, L1, 0, S0, S1, S2, 0 shown in FIG. 5; etc.) during which a multibit data word including a first data bit (e.g., L0) and a second data bit (e.g., L1) will be asserted on a pixel 400 of display 204. In a second step 904, DLS controller 224 defines a light modulation sequence that includes a plurality of time intervals 604 when the light source 206 is turned off and a plurality of time intervals 604 when the light source 206 is turned on to generate a full brightness display image. The light modulation sequence is coordinated with the data assertion sequence, such as via the Vsync signal. Then, in a third step 906, DLS controller 224 periodically turns the light source 206 during said on time intervals to generate a lower brightness display image.

Figure 10:
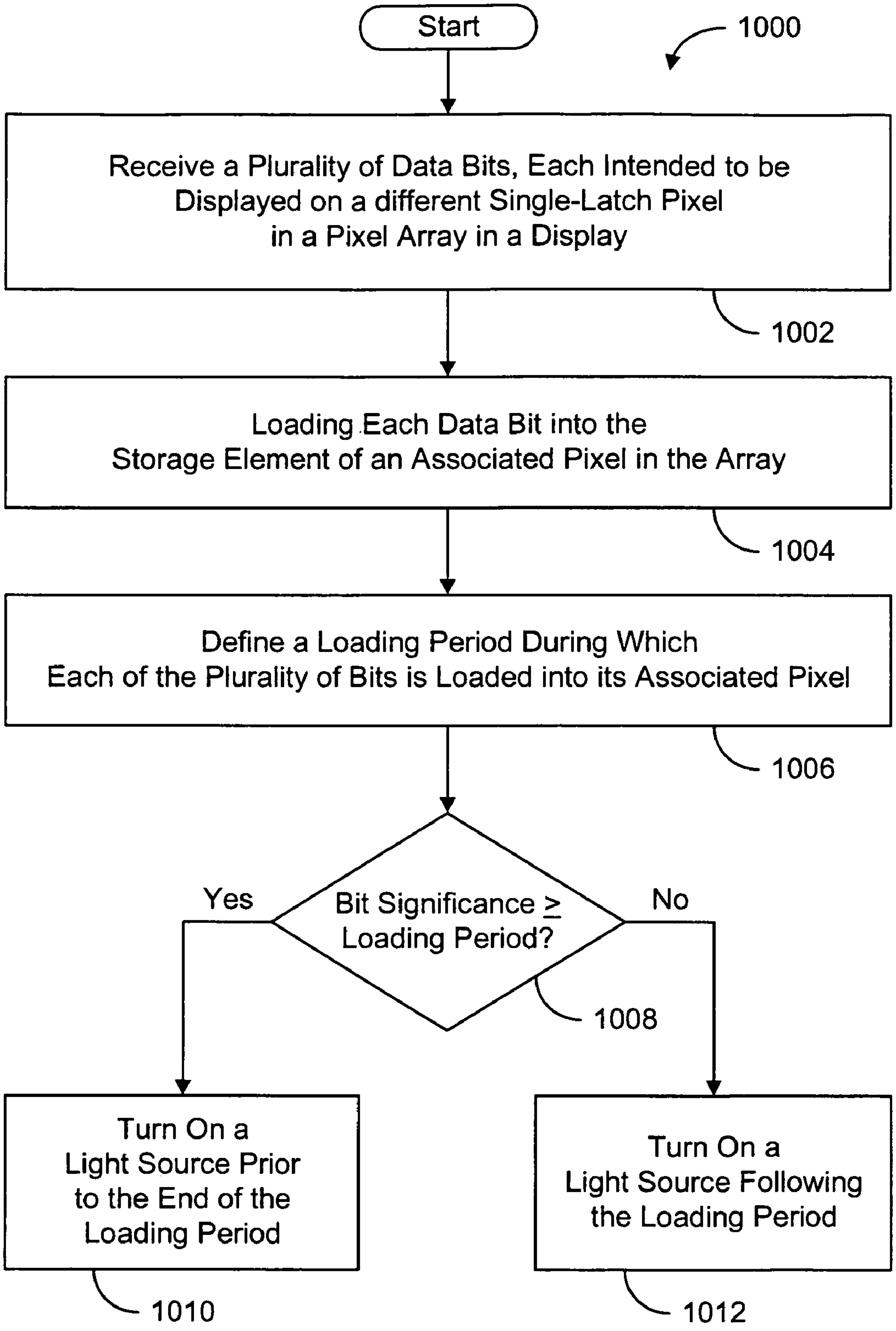
FIG. 10 is a flowchart summarizing another method for loading data into and modulating a display according to the present invention.

FIG. 10 is a flowchart summarizing another method 1000 for loading data into and modulating the pixels 400 of a display 204 according to the present invention. In a first step 1002 of method 1000, one of frame buffers 220(A) and 220(B) receives a plurality of data bits (e.g., one or more bit planes of data for an image frame), each intended to be displayed on a different pixel 400 in the array of display 204. Then, in a second step 1004, DIOC 222 asserts control signal on buffer control lines 232 and display control lines 234 such that the data bits (e.g., a bit plane of data) are output from frame buffer 220(A) or 220(B) and are loaded into the storage elements 402 of the associated pixels 400 in display 204. Because the storage element 402 of each pixel 400 is coupled to the pixel electrode 404, the value of the loaded data bit controls the voltage asserted on pixel electrode 404 whenever the data bit is loaded in the storage element 402. In a third step 1006, timing generator 208 defines a loading period during which the data bits are loaded into the storage elements 402 of their associated pixels 400. Then, in a fourth step 1008, DLS controller 224 determines, via state signals issued by DIOC 222 on state signal line 236, whether the bit significance of each loaded data bit is greater than or equal to the duration of the loading period. If so, then in a tenth step 1010, DLS controller 224 turns DLS 206 on prior to the end of the loading period. In contrast, if in step 1008, DLS controller 224 determines that the bit significance of each loaded bit is less than the duration of the loading period, then in a sixth step 1012, DLS controller 224 turns DLS 206 on following the loading period.

The description of particular embodiments of the present invention is now complete. Many of the described features may be substituted, altered or omitted without departing from the scope of the invention. For example, alternative displays (e.g., three display panels, separation and recombination equipment, etc.), may be substituted for the single display 204 presented. As another example, off-states may be asserted on the pixels of the display using other methods than writing bits having off-state values to the display. Accordingly, data mapper 302 may be eliminated and the display 204 driven with unmapped input data bits rather than mapped display data. These and other deviations from the particular embodiments shown will be apparent to those skilled in the art, particularly in view of the foregoing disclosure.

I claim:

1. A method for driving a display having an array of pixels arranged in a plurality of columns and a plurality of rows, said method comprising:

receiving a first data bit intended to be displayed on one of said pixels in one of said rows of said array, said first data bit having a first bit significance;

defining a first loading period during which said first data bit is loaded into said storage element and data bits of said first bit significance are loaded into respective storage elements of each of a plurality of said rows of said display;

loading said first data bit into a storage element of said pixel, the value of said first data bit controlling a voltage asserted on a pixel electrode of said pixel whenever said first data bit is stored in said storage element;

turning on a light source to illuminate said pixel while said data bit is stored in said storage element;

receiving a second data bit intended to be displayed on said pixel after said first data bit is displayed on said pixel, said second data bit having a second bit significance;

defining a second loading period during which said second data bit is loaded into said storage element and data bits of said second bit significance are loaded into said respective storage elements of each of said plurality of said rows of said display;

loading said second data bit into said storage element of said pixel, the value of said second data bit controlling said voltage asserted on said pixel electrode whenever said second data bit is stored in said storage element;

keeping said light source turned on while said first data bit is replaced by said second data bit by said loading of said second data bit into said storage element;

receiving a third data bit intended to be displayed on said pixel after said second data bit, said third data bit having a third bit significance;

defining a third loading period during which said third data bit is loaded into said storage element and data bits of said third bit significance are loaded into said respective storage elements of each of said plurality of said rows of said display;

loading said third data bit into said storage element of said pixel, the value of said third data bit controlling the voltage asserted on said pixel electrode whenever said third data bit is stored in said storage element;

turning said light source off during said third loading period; and turning said light source on after said third loading period; and wherein the time period during which said first data bit is stored in said storage element exceeds the duration of said first loading period;

the time period during which said second data bit is stored in said storage element exceeds the duration of said second loading period; and the time period during which said light source is turned on and said third data bit is stored in said storage element is less than the duration of said third loading period.

2. A method according to claim 1, further comprising asserting an off-state on said pixel electrode of said pixel prior to said step of loading said third data bit into said storage element of said pixel, said off-state being asserted on said pixel electrode for an amount of time corresponding to said duration of said second loading period.

3. A method according to claim 2, wherein said step of asserting said off-state on said pixel electrode prior to loading said third data bit comprises:

receiving a bit having an off-state value; and loading said bit having said off-state value into said storage element of said pixel, said off-state being asserted on said pixel electrode whenever said bit having said off-state value is stored in said storage element.

4. A method according to claim 1, wherein said step of turning said light source on after said third loading period comprises turning said light source on for an amount of time corresponding to said third bit significance.

5. A method according to claim 4, further comprising:

receiving a fourth data bit intended to be displayed on said pixel after said third data bit, said fourth data bit having a fourth bit significance;

loading said fourth data bit into said storage element of said pixel, the value of said fourth data bit controlling the voltage asserted on said pixel electrode whenever said fourth data bit is stored into said storage element;

defining a fourth loading period during which said fourth data bit is loaded into said storage element and data bits of said fourth significance are loaded into said respective storage elements of each of said plurality of said rows of said display;

turning said light source on while said third data bit is replaced by said fourth data bit by said loading of said fourth data bit into said storage element; and wherein the time period during which said fourth data bit is stored in said storage element exceeds the duration of said fourth loading period.

6. A method according to claim 5, further comprising asserting an off-state on said pixel electrode of said pixel prior to said step of loading said fourth data bit into said storage element of said pixel.

7. A method according to claim 6, wherein said step of asserting said off-state prior to said step of loading said fourth data bit comprises:

receiving a bit having an off-state value; and loading said bit having said off-state value into said storage element of said pixel, said off-state being asserted on said pixel electrode whenever said bit having said off-state value is stored in said storage element.

8. A method according to claim 5, wherein the durations of said loading period, said second loading period, said third loading period, and said fourth loading are equal.

9. A method according to claim 1, further comprising:

defining a data assertion sequence during which a multibit data word including said first data bit and said second data bit will be asserted on said pixel;

defining a light modulation sequence including a plurality of off time intervals when said light source is off and a plurality of on time intervals when said light source is on, said light modulation sequence being coordinated with said data assertion sequence to generate a full brightness display image; and periodically turning said light source off during said on time intervals to generate a lower brightness display image.

10. A method according to claim 9, further comprising:

defining a second data assertion sequence during which a second multibit data word will be asserted on said pixel;

defining a second light modulation sequence including said plurality of off time intervals and said plurality of on time intervals, said second light modulation sequence being coordinated with said second data assertion sequence to generate a second full brightness display image; and periodically turning said light source off during said on time intervals in said second light modulation sequence to generate a second lower brightness display image, the ones of said on time intervals turned off during said second light modulation sequence being different than the ones of said on time intervals turned off during said light modulation sequence.

11. A method according to claim 9, wherein said step of periodically turning said light source off during said on time intervals includes turning said light source on every $x^{th}$ one of said on time intervals and turning said light source off during all other ones of said on time intervals, where x is an integer greater than one.

12. A method according to claim 11, wherein:

x equals two; and said light source is turned off during every other one of said on time intervals in said light modulation sequence, beginning with a first one of said on time intervals in said light modulation sequence.

13. A method according to claim 12, further comprising:

defining a second data assertion sequence during which a second multibit data word will be asserted on said pixel;

defining a second light modulation sequence including said plurality of off time intervals and said plurality of on time intervals, said second light modulation sequence being coordinated with said second data assertion sequence to generate a second full brightness display image; and turning said light source off during every other one of said on time intervals in said second light modulation sequence beginning with a second one of said on time intervals in said second light modulation sequence different than said first one of said on time intervals in said light modulation sequence to generate a second lower brightness display image.

14. A method according to claim 11, wherein:

x equals four;

said light source is turned on during every fourth one of said on time intervals beginning with a first one of said on time intervals in said light modulation sequence; and said light source is turned off during all other ones of said on time intervals in said light modulation sequence.

15. A method according to claim 14, further comprising:

defining a second data assertion sequence during which a second multibit data word will be asserted on said pixel;

defining a second light modulation sequence including said plurality of off time intervals and said plurality of on time intervals, said second light modulation sequence being coordinated with said second data assertion sequence to generate a second full brightness display image;

turning said light source on during every fourth one of said on time intervals in said second light modulation sequence beginning with a second one of said on time intervals in said second light modulation sequence different than said first one of said on time intervals in said light modulation sequence; and turning said light source off during all other ones of said on time intervals in said second light modulation sequence to generate a second lower brightness display image.

16. A method according to claim 15, further comprising:

defining a third data assertion sequence during which a third multibit data word will be asserted on said pixel;

defining a third light modulation sequence including said plurality of off time intervals and said plurality of on time intervals, said third light modulation sequence being coordinated with said third data assertion sequence to generate a third full brightness display image;

turning said light source on during every fourth one of said on time intervals in said third light modulation sequence beginning with a third one of said on time intervals different than said first one of said on time intervals in said light modulation sequence and said second one of said on time intervals in said second light modulation sequence;

turning said light source off during all other ones of said on time intervals in said third light modulation sequence to generate a third lower brightness display image;

defining a fourth data assertion sequence during which a fourth multibit data word will be asserted on said pixel;

defining a fourth light modulation sequence including said plurality of off time intervals and said plurality of on time intervals, said fourth light modulation sequence being coordinated with said fourth data assertion sequence to generate a fourth full brightness display image;

turning said light source on during every fourth one of said on time intervals in said fourth light modulation sequence beginning with a fourth one of said on time intervals different than said first one of said on time intervals in said light modulation sequence, said second one of said on time intervals in said second light modulation sequence, and said third one of said on time intervals in said third light modulation sequence; and turning said light source off during all other ones of said on time intervals in said fourth light modulation sequence to generate a fourth lower brightness display image.

17. A method according to claim 11, further comprising:

defining a first loading period in said data assertion sequence during which said first data bit is loaded into said storage element and data bits of said first bit significance are loaded into respective storage elements of each of a plurality of said rows of said display; and wherein said loading period occurs during a predetermined number of said time intervals in said light modulation sequence; and x is an integer less than said predetermined number of said time intervals in said loading period.

18. A method according to claim 1, wherein said display is driven in field-sequential mode.

19. A method according to claim 1, wherein said light source is a light-emitting diode.

20. A display driver for driving an array of pixels arranged in a plurality of columns and a plurality of rows, said display driver comprising:

a data input terminal set operative to receive a first data bit intended to be displayed on one of said pixels in one of said rows of said array, said first data bit having a first bit significance;

a data controller operative to load said data bit into a storage element of said pixel, the value of said data bit controlling a voltage asserted on a pixel electrode of said pixel whenever said data bit is stored in said storage element;

a light source controller operative to turn on a light source to illuminate said pixel while said data bit is stored in said storage element; and a timer operative to define a first loading period during which said data controller will load said first data bit into said storage element and data bits of said first bit significance into respective storage elements of each of a plurality of said rows of said display; and wherein said data input terminal set is further operative to receive a second data bit intended to be displayed on said pixel after said first data bit is displayed on said pixel, said second data bit having a second bit significance;

said data controller is further operative to load said second data bit into said storage element of said pixel, the value of said second data bit controlling said voltage asserted on said pixel electrode whenever said second data bit is stored in said storage element;

said timer is further operative to define a second loading period during which said data controller will load said second data bit into said storage element and data bits of said second bit significance into said respective storage elements of each of said plurality of said rows of said display;

said light source controller is further operative to keep said light source turned on while said first data bit is replaced by said second data bit when said data controller loads said second data bit into said storage element;

the time period during which said first data bit is stored in said storage element exceeds the duration of said first loading period; and the time period during which said second data bit is stored in said storage element exceeds the duration of said second loading period;

said data input terminal set is further operative to receive a third data bit intended to be displayed on said pixel after said second data bit is displayed on said pixel, said third data bit having a third bit significance;

said data controller is further operative to load said third data bit into said storage element of said pixel, the value of said third data bit controlling said voltage asserted on said pixel electrode whenever said third data bit is stored in said storage element;

said timer is further operative to define a third loading period during which said data controller will load said third data bit into said storage element and data bits of said third bit significance into said respective storage elements of each of said plurality of said rows of said display;

said light source controller is operative to turn said light source off during said third loading period;

said light source controller is operative to turn said light source on after said third loading period; and the time period during which said light source is turned on and said third data bit is stored in said storage element is less than the duration of said third loading period.

21. A display driver according to claim 20, wherein:

said data controller is operative to assert an off-state on said pixel electrode of said pixel prior to said data controller loading said third data bit into said storage element of said pixel; and said off-state is asserted on said pixel electrode for an amount of time corresponding to the duration of said second loading period.

22. A display driver according to claim 21, wherein:

said input terminal set is further operative to receive a bit having an off-state value; and said data controller is further operative to load said bit having said off-state value into said storage element of said pixel, said off-state value being asserted on said pixel electrode whenever said bit having said off-state value is stored in said storage element.

23. A display driver according to claim 20, wherein said light source controller is operative to turn said light source on after said third loading period for an amount of time corresponding to said third bit significance.

24. A display driver according to claim 20, wherein:

said data input terminal set is further operative to receive a fourth data bit intended to be displayed on said pixel after said third data bit is displayed on said pixel, said fourth data bit having a fourth bit significance;

said data controller is further operative to load said fourth data bit into said storage element of said pixel, the value of said fourth data bit controlling said voltage asserted on said pixel electrode whenever said fourth data bit is stored in said storage element;

said timer is further operative to define a fourth loading period during which said data controller will load said fourth data bit into said storage element and data bits of said fourth bit significance into said respective storage elements of each of said plurality of said rows of said display;

said light source controller is operative to turn said light source on while said third data bit is replaced by said fourth data bit when said data controller loads said fourth data bit into said storage element; and the time period during which said fourth data bit is stored in said storage element exceeds the duration of said fourth loading period.

25. A display driver according to claim 24, wherein said data controller is operative to assert an off-state on said pixel electrode of said pixel prior to said data controller loading said fourth data bit into said storage element of said pixel.

26. A display driver according to claim 25, wherein:

said input terminal set is further operative to receive a bit having an off-state value; and said data controller is further operative to load said bit having said off-state value into said storage element of said pixel, said off-state value being asserted on said pixel electrode whenever said bit having said off-state value is stored in said storage element.

27. A display driver according to claim 24, wherein the durations of said loading period, said second loading period, said third loading period, and said fourth loading period are equal.

28. A display driver according to claim 20, wherein:

said data controller is operative to define a data assertion sequence during which a multibit data word including said first data bit and said second data bit will be asserted on said pixel; and said light source controller is operative to define a light modulation sequence including a plurality of off time intervals when said light source is off and a plurality of on time intervals when said light source is on, said light modulation sequence being coordinated with said data assertion sequence to generate a full brightness display image, and periodically turn said light source off during said on time intervals to generate a lower brightness display image.

29. A display driver according to claim 28, wherein:

said data controller is operative to define a second data assertion sequence during which a second multibit data word will be asserted on said pixel; and said light source controller is operative to define a second light modulation sequence including said plurality of off time intervals and said plurality of on time intervals, said second light modulation sequence being coordinated with said data assertion sequence to generate a second full brightness display image, and periodically turn said light source off during said on time intervals in said second light modulation sequence to generate a second lower brightness display image, the ones of said on time intervals turned off during said second light modulation sequence being different than the ones of said on time intervals turned off during said light modulation sequence.

30. A display driver according to claim 28, wherein said light source controller is operative to turn said light source on during every $x^{th}$ one of said on time intervals and turn said light source off during all other ones of said on time intervals, where x is an integer greater than one.

31. A display driver according to claim 30, wherein:

x equals two; and said light source controller is operative to turn said light source off during every second one of said on time intervals in said light modulation sequence, beginning with a first one of said on time intervals in said light modulation sequence.

32. A display driver according to claim 31, wherein:

said data controller is operative to define a second data assertion sequence during which a second multibit data word will be asserted on said pixel; and said light source controller is operative to define a second light modulation sequence including said plurality of off time intervals and said plurality of on time intervals, said second light modulation sequence being coordinated with said second data assertion sequence to generate a second full brightness display image, and turn said light source off during every second one of said on time intervals in said second light modulation sequence beginning with a second one of said on time intervals in said second light modulation sequence different than said first one of said on time intervals in said light modulation sequence.

33. A display driver according to claim 30, wherein:

x equals four; and said light source controller is operative to turn said light source on during every fourth one of said on time intervals beginning with a first one of said on time intervals in said light modulation sequence; and turn said light source off during all other ones of said on time intervals in said light modulation sequence.

34. A display driver according to claim 33, wherein:

said data controller is operative to define a second data assertion sequence during which a second multibit data word will be asserted on said pixel; and said light source controller is operative to define a second light modulation sequence including said plurality of off time intervals and said plurality of on time intervals, said second light modulation sequence being coordinated with said second data assertion sequence to generate a second full brightness display image, turn said light source on during every fourth one of said on time intervals in said second light modulation sequence beginning with a second one of said on time intervals in said second light modulation sequence different than said first one of said on time intervals in said light modulation sequence, and turn said light source off during all other ones of said on time intervals in said second light modulation sequence to generate a second lower brightness display image.

35. A display driver according to claim 34, wherein:

said data controller is operative to define a third data assertion sequence during which a third multibit data word will be asserted on said pixel;

said light source controller is operative to define a third light modulation sequence including said plurality of off time intervals and said plurality of on time intervals, said third light modulation sequence being coordinated with said third data assertion sequence to generate a third full brightness display image, turn said light source on during every fourth one of said on time intervals in said third light modulation sequence beginning with a third one of said on time intervals in said third light modulation sequence different than said first one of said on time intervals in said light modulation sequence and said second one of said time intervals in said second light modulation sequence, and turn said light source off during all other ones of said on time intervals in said third light modulation sequence to generate a third lower brightness display image;

said data controller is operative to define a fourth data assertion sequence during which a fourth multibit data word will be asserted on said pixel; and said light source controller is operative to define a fourth light modulation sequence including said plurality of off time intervals and said plurality of on time intervals, said fourth light modulation sequence being coordinated with said fourth data assertion sequence to generate a fourth full brightness display image, turn said light source on during every fourth one of said on time intervals in said fourth light modulation sequence beginning with a fourth one of said on time intervals in said fourth light modulation sequence different than said first one of said on time intervals in said light modulation sequence, said second one of said time intervals in said second light modulation sequence, and said third one of said time intervals in said third light modulation sequence, and turn said light source off during all other ones of said on time intervals in said fourth light modulation sequence to generate a fourth lower brightness display image.

36. A display driver according to claim 30, further comprising:

a timer operative to define a first loading period in said data assertion sequence during which said data controller will load said first data bit into said storage element and said data bits of said first bit significance into respective storage elements of each of a plurality of said rows of said display; and wherein said loading period occurs during a predetermined number of said time intervals in said light modulation sequence; and x is an integer less than said predetermined number of said time intervals in said loading period.

37. A display driver according to claim 20, wherein said display driver drives said display in field-sequential mode.

38. A display driver according to claim 20, wherein said light source is a light-emitting diode.

39. A non-transitory computer readable storage medium having code embodied therein for causing an electronic device to drive a display having an array of pixels arranged in a plurality of columns and a plurality of rows, said code causing said electronic device to:

receive a first data bit intended to be displayed on one of said pixels in one of said rows of said array, said first data bit having a first bit significance;

define a first loading period during which said first data bit is loaded into said storage element and data bits of said first bit significance are loaded into respective storage elements of each of a plurality of said rows of said display;

load said first data bit into a storage element of said pixel, the value of said first data bit controlling a voltage asserted on a pixel electrode of said pixel whenever said first data bit is stored in said storage element;

turn on a light source to illuminate said pixel while said data bit is stored in said storage element;

receive a second data bit intended to be displayed on said pixel after said first data bit is displayed on said pixel, said second data bit having a second bit significance;

define a second loading period during which said second data bit is loaded into said storage element and data bits of said second bit significance are loaded into said respective storage elements of each of said plurality of said rows of said display;

load said second data bit into said storage element of said pixel, the value of said second data bit controlling said voltage asserted on said pixel electrode whenever said second data bit is stored in said storage element;

keep said light source turned on while said first data bit is replaced by said second data bit by said loading of said second data bit into said storage element;

receive a third data bit intended to be displayed on said pixel after said second data bit, said third data bit having a third bit significance;

define a third loading period during which said third data bit is loaded into said storage element and data bits of said third bit significance are loaded into said respective storage elements of each of said plurality of said rows of said display;

load said third data bit into said storage element of said pixel, the value of said third data bit controlling the voltage asserted on said pixel electrode whenever said third data bit is stored in said storage element;

turn said light source off during said third loading period; and turn said light source on after said third loading period; and wherein the time period during which said first data bit is stored in said storage element exceeds the duration of said first loading period;

the time period during which said second data bit is stored in said storage element exceeds the duration of said second loading period; and the time period during which said light source is turned on and said third data bit is stored in said storage element is less than the duration of said third loading period.

40. The non-transitory computer readable storage medium of claim 39, wherein said code embodied therein additionally causes said electronic device to assert an off-state on said pixel electrode of said pixel prior to loading said third data bit into said storage element of said pixel, said off-state being asserted on said pixel electrode for an amount of time corresponding to said duration of said second loading period.

41. The non-transitory computer readable storage medium of claim 40, wherein asserting said off-state on said pixel electrode prior to loading said third data bit comprises:

receiving a bit having an off-state value; and loading said bit having said off-state value into said storage element of said pixel, said off-state being asserted on said pixel electrode whenever said bit having said off-state value is stored in said storage element.

42. The non-transitory computer readable storage medium of claim 39, wherein turning said light source on after said third loading period comprises turning said light source on for an amount of time corresponding to said third bit significance.

43. The non-transitory computer readable storage medium of claim 42, wherein said code embodied therein additionally causes said electronic device to:

receive a fourth data bit intended to be displayed on said pixel after said third data bit, said fourth data bit having a fourth bit significance;

load said fourth data bit into said storage element of said pixel, the value of said fourth data bit controlling the voltage asserted on said pixel electrode whenever said fourth data bit is stored into said storage element;

define a fourth loading period during which said fourth data bit is loaded into said storage element and data bits of said fourth significance are loaded into said respective storage elements of each of said plurality of said rows of said display; and turn said light source on while said third data bit is replaced by said fourth data bit by said loading of said fourth data bit into said storage element; and wherein the time period during which said fourth data bit is stored in said storage element exceeds the duration of said fourth loading period.

44. The non-transitory computer readable storage medium of claim 43, wherein said code embodied therein additionally causes said electronic device to assert an off-state on said pixel electrode of said pixel prior to loading said fourth data bit into said storage element of said pixel.

45. The non-transitory computer readable storage medium of claim 44, wherein asserting said off-state prior to loading said fourth data bit comprises:

receiving a bit having an off-state value; and loading said bit having said off-state value into said storage element of said pixel, said off-state being asserted on said pixel electrode whenever said bit having said off-state value is stored in said storage element.

46. The non-transitory computer readable storage medium of claim 43, wherein the durations of said loading period, said second loading period, said third loading period, and said fourth loading are equal.

47. The non-transitory computer readable storage medium of claim 39, wherein said code embodied therein additionally causes said electronic device to:

define a data assertion sequence during which a multibit data word including said first data bit and said second data bit will be asserted on said pixel;

define a light modulation sequence including a plurality of off time intervals when said light source is off and a plurality of on time intervals when said light source is on, said light modulation sequence being coordinated with said data assertion sequence to generate a full brightness display image; and periodically turn said light source off during said on time intervals to generate a lower brightness display image.

48. The non-transitory computer readable storage medium of claim 47, wherein said code embodied therein additionally causes said electronic device to:

define a second data assertion sequence during which a second multibit data word will be asserted on said pixel;

define a second light modulation sequence including said plurality of off time intervals and said plurality of on time intervals, said second light modulation sequence being coordinated with said second data assertion sequence to generate a second full brightness display image; and periodically turn said light source off during said on time intervals in said second light modulation sequence to generate a second lower brightness display image, the ones of said on time intervals turned off during said second light modulation sequence being different than the ones of said on time intervals turned off during said light modulation sequence.

49. The non-transitory computer readable storage medium of claim 47, wherein periodically turning said light source off during said on time intervals includes turning said light source on every $x^{th}$ one of said on time intervals and turning said light source off during all other ones of said on time intervals, where x is an integer greater than one.

50. The non-transitory computer readable storage medium of claim 49, wherein:

x equals two; and said light source is turned off during every other one of said on time intervals in said light modulation sequence, beginning with a first one of said on time intervals in said light modulation sequence.

51. The non-transitory computer readable storage medium of claim 50, wherein said code embodied therein additionally causes said electronic device to:

define a second data assertion sequence during which a second multibit data word will be asserted on said pixel;

define a second light modulation sequence including said plurality of off time intervals and said plurality of on time intervals, said second light modulation sequence being coordinated with said second data assertion sequence to generate a second full brightness display image; and turn said light source off during every other one of said on time intervals in said second light modulation sequence beginning with a second one of said on time intervals in said second light modulation sequence different than said first one of said on time intervals in said light modulation sequence to generate a second lower brightness display image.

52. The non-transitory computer readable storage medium of claim 49, wherein:

x equals four;

said light source is turned on during every fourth one of said on time intervals beginning with a first one of said on time intervals in said light modulation sequence; and said light source is turned off during all other ones of said on time intervals in said light modulation sequence.

53. The non-transitory computer readable storage medium of claim 52, wherein said code embodied therein additionally causes said electronic device to:

define a second data assertion sequence during which a second multibit data word will be asserted on said pixel;

define a second light modulation sequence including said plurality of off time intervals and said plurality of on time intervals, said second light modulation sequence being coordinated with said second data assertion sequence to generate a second full brightness display image;

turn said light source on during every fourth one of said on time intervals in said second light modulation sequence beginning with a second one of said on time intervals in said second light modulation sequence different than said first one of said on time intervals in said light modulation sequence; and turn said light source off during all other ones of said on time intervals in said second light modulation sequence to generate a second lower brightness display image.

54. The non-transitory computer readable storage medium of claim 53, wherein said code embodied therein additionally causes said electronic device to:

define a third data assertion sequence during which a third multibit data word will be asserted on said pixel;

define a third light modulation sequence including said plurality of off time intervals and said plurality of on time intervals, said third light modulation sequence being coordinated with said third data assertion sequence to generate a third full brightness display image;

turn said light source on during every fourth one of said on time intervals in said third light modulation sequence beginning with a third one of said on time intervals different than said first one of said on time intervals in said light modulation sequence and said second one of said on time intervals in said second light modulation sequence;

turn said light source off during all other ones of said on time intervals in said third light modulation sequence to generate a third lower brightness display image;

define a fourth data assertion sequence during which a fourth multibit data word will be asserted on said pixel;

define a fourth light modulation sequence including said plurality of off time intervals and said plurality of on time intervals, said fourth light modulation sequence being coordinated with said fourth data assertion sequence to generate a fourth full brightness display image;

turn said light source on during every fourth one of said on time intervals in said fourth light modulation sequence beginning with a fourth one of said on time intervals different than said first one of said on time intervals in said light modulation sequence, said second one of said on time intervals in said second light modulation sequence, and said third one of said on time intervals in said third light modulation sequence; and turn said light source off during all other ones of said on time intervals in said fourth light modulation sequence to generate a fourth lower brightness display image.

55. The non-transitory computer readable storage medium of claim 49, wherein said code embodied therein additionally causes said electronic device to:

define a first loading period in said data assertion sequence during which said first data bit is loaded into said storage element and data bits of said first bit significance are loaded into respective storage elements of each of a plurality of said rows of said display; and wherein said loading period occurs during a predetermined number of said time intervals in said light modulation sequence; and x is an integer less than said predetermined number of said time intervals in said loading period.

56. The non-transitory computer readable storage medium of claim 39, wherein said display is driven in field-sequential mode.

57. The non-transitory computer readable storage medium of claim 39, wherein said light source is a light-emitting diode.

* * * * *

UNITED STATES PATENT AND TRADEMARK OFFICE
CERTIFICATE OF CORRECTION

PATENT NO. : 8,223,141 B2
APPLICATION NO. : 12/288012
DATED : July 17, 2012
INVENTOR(S) : Sunny Yat-san Ng It is certified that error appears in the above-identified patent and that said Letters Patent is hereby corrected as shown below:

In the Claims

Column 28, line 7 (Claim 24, line 1) cancel the text “claim 20” and insert in its place the text --claim 23--.

Signed and Sealed this
Twenty-second Day of October, 2013

Teresa Stanek Rea
*Deputy Director of the United States Patent and Trademark Office*